(12) United States Patent
Umezu

(10) Patent No.: US 7,477,313 B2
(45) Date of Patent: Jan. 13, 2009

(54) LIGHT-QUANTITY ADJUSTING APPARATUS, OPTICAL APPARATUS, AND CAMERA

(75) Inventor: Takuji Umezu, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 754 days.

(21) Appl. No.: 10/691,141

(22) Filed: Oct. 21, 2003

(65) Prior Publication Data

US 2005/0073604 A1   Apr. 7, 2005

(30) Foreign Application Priority Data

Oct. 21, 2002   (JP)   ............... 2002-305595

(51) Int. Cl.
*H04N 5/238* (2006.01)
*H04N 5/225* (2006.01)
*G03B 7/00* (2006.01)

(52) U.S. Cl. ................ 348/363; 348/360; 348/342; 396/241

(58) Field of Classification Search ............ 348/363, 348/342, 360; 359/888, 889; 396/209, 241
See application file for complete search history.

(56) References Cited

U.S. PATENT DOCUMENTS

| 5,764,292 | A | * | 6/1998 | Yamaguchi | ............ 348/363 |
| 6,340,252 | B1 | * | 1/2002 | Kawano | ............ 396/485 |
| 6,533,473 | B1 | * | 3/2003 | Edamitsu et al. | ............ 348/362 |
| 6,771,315 | B1 | * | 8/2004 | Nanjo et al. | ............ 348/362 |
| 6,927,798 | B2 | * | 8/2005 | Kaneda | ............ 348/363 |
| 7,079,186 | B2 | * | 7/2006 | Hashimoto | ............ 348/342 |

FOREIGN PATENT DOCUMENTS

| JP | 11-64923 | | 3/1999 |
| JP | 11-064923 | * | 3/1999 |

* cited by examiner

*Primary Examiner*—Nhan T Tran
(74) *Attorney, Agent, or Firm*—Morgan & Finnegan, LLP

(57) ABSTRACT

A light-quantity adjusting apparatus which can temporarily suppress an MTF (contrast) from being deteriorated by small-aperture diffraction is disclosed. The light-quantity adjusting apparatus comprises a main body in which an opening is formed, a light-blocking member moved with respect to the opening to change an area of a light-passing aperture, an optical filter moved with respect to the opening to insert and remove with respect to a region opposed the light-passing aperture, an actuator serving as a drive source, a drive mechanism for driving the light-blocking member and the optical filter by drive force from the actuator.

6 Claims, 20 Drawing Sheets

PRIOR ART

LIGHT-QUANTITY ADJUSTING APPARATUS, OPTICAL APPARATUS, AND CAMERA

BACKGROUND OF THE INVENTION

1. Field of the Invention

The present invention relates to a light-quantity adjusting apparatus, an optical apparatus and a camera having the light-quantity adjusting apparatus.

2. Description of Related Art

As a conventional light-quantity adjusting apparatus mounted on an image-taking apparatus such as a video camera, a light-quantity adjusting apparatus having the configuration shown in FIG. 18 is known. The light-quantity adjusting apparatus has two blades, and has a configuration in which one rotation type electromagnetic actuator (motor) 23c is used as a drive source to drive two diaphragm blades 23a and 23b through a seesaw-type drive lever 23d.

An ND (neutral density) filter 23a1 is stuck on the diaphragm blade 23a. When an object is bright, when an aperture (diaphragm aperture) formed by the diaphragm blades 23a and 23b is excessively small in diameter, degradation of image quality caused by diffraction of light and reflection of dust caused by increasing depth of focus are posed as problems. For this reason, the ND filter 23a1 is stuck on the diaphragm blade 23a to position the ND filter 23a1 in the diaphragm aperture of the diaphragm blades 23a and 23b, so that a diaphragm aperture is repressed from being excessively small.

FIGS. 19(A) to 19(H) are diagrams showing continuously movements of the light-quantity adjusting apparatus having the above-described configuration when a diaphragm is driven from an open state to a closed state. In the intermediate states (B) to (F) before a small aperture shown in FIG. 19(G) or 19(H), a pass-through portion where the ND filter 23a1 does not entirely cover the whole area of the diaphragm aperture formed by the diaphragm blades 23a and 23b bring about an effect as if the pass-through portion were a small aperture, and image quality is degraded.

In order to solve this problem, in recent years, an image pickup element decreases in size, and a pixel pitch becomes small to increase the influence of diffraction. For this reason, a light-quantity adjusting apparatus that independently drives two diaphragm blades and ND blades having two or more different concentrations is proposed. FIG. 20 is an exploded perspective view of the light-quantity adjusting apparatus.

In this light-quantity adjusting apparatus, a pivoting arm 101 pivots in response to drive force from a motor 102, two diaphragm blades 103 and 104 move in opposite directions (upward and downward directions in FIG. 20) to change a diaphragm aperture area serving as a light-passing area. When a pivoting arm 105 pivots in response to drive force from a motor 106, an ND filter holding member 108 on which an ND filter 107 is stuck moves in the upward and downward directions in FIG. 20. In this manner, the ND filter 107 moves in the diaphragm aperture formed by the diaphragm blades 103 and 104.

However, in the light-quantity adjusting apparatus described above, since the two motors 102 and 106 are used to drive the diaphragm blades 103 and 104, the light-quantity adjusting apparatus increases in size due to an increase in number of parts.

Therefore, a diaphragm apparatus for driving diaphragm blades and an ND filter by drive force from one drive source while reducing the influence of diffraction is known (for example, Japanese Patent Application Laid-Open No. H11 (1999)-64923 (FIGS. 5 and 6)). In this diaphragm apparatus, the influence of diffraction (degradation of image quality) caused by a pass-through portion that becomes minimum in an intermediate aperture obtained before a small aperture is achieved is reduced.

More specifically, the diaphragm apparatus has two diaphragm blades and an ND filter holding member to which a first ND filter is attached, and the ND filter holding member is arranged such that the ND filter holding member is moved in the same direction as that of the other diaphragm blade positioned to be opposed to one diaphragm blade in an optical axis direction. A second ND filter is attached to the other diaphragm blade to partially cover a notch for forming the diaphragm aperture, and an area where the first ND filter covers the diaphragm aperture is made larger than an area where the second ND filter covers the diaphragm aperture, and a displacement amount of the first ND filter depending on a change in aperture diameter is made larger than a displacement amount of the second ND filter.

However, in a light-quantity adjusting apparatus disclosed in Japanese Patent application Laid-Open No. H11-64923, as shown in FIG. 6 of this reference, a section in which a diaphragm aperture change includes a large section in which contrast becomes low. In this case, in the section in which the contrast becomes low, an MTF (Modulation Transfer Function) is deteriorated. If the section in which the contrast becomes low is large, when the light-quantity adjusting apparatus is mounted on an image pickup apparatus, a high-quality image cannot be obtained.

SUMMARY OF THE INVENTION

One aspect of a light-quantity adjusting apparatus according to the present invention comprises a main body in which an opening is formed, a light-blocking member moved with respect to the opening to change an area of a light-passing aperture, an optical filter moved with respect to the opening to insert and remove with respect to a region opposed the light-passing aperture, an actuator serving as a drive source and a drive mechanism for driving the light-blocking member and the optical filter by drive force from the actuator. The drive mechanism has an operation range in which a displacement amount of the optical filter with respect to the opening is made larger than a displacement amount of the light-blocking member with respect to the opening, while the actuator operates by a predetermined amount.

One aspect of an optical apparatus according to the present invention comprises the above light-quantity adjusting apparatus and an image-taking optical system including the light-quantity adjusting apparatus.

One aspect of a camera according to the present invention comprises the above light-quantity adjusting apparatus, an image-taking optical system including the light-quantity adjusting apparatus and an image pickup element which photoelectrically converts an object image formed by the image-taking optical system into an electric signal.

The characteristic features of the light-quantity adjusting apparatus, the optical apparatus, and the camera will be apparent from the following description of concrete examples with reference to the accompanying drawings.

DETAILED DESCRIPTION OF THE PREFFERED EMBODIMENTS

Embodiments of the present invention will be described below with reference to the accompanying drawings.

Embodiment 1

Figure 1:
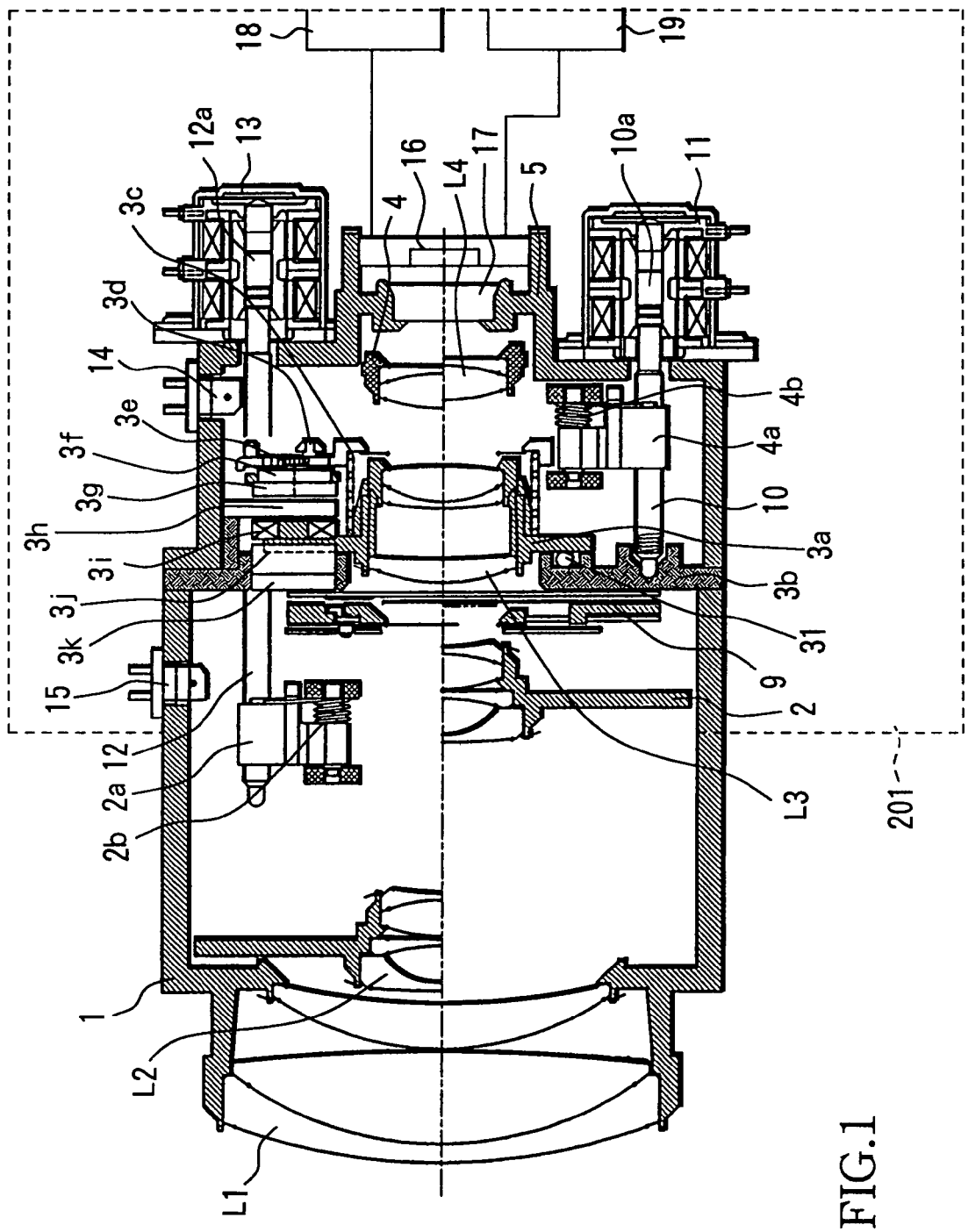
FIG. 1 is a main sectional view of a lens barrel.

A light-quantity adjusting apparatus in an optical apparatus according to Embodiment 1 of the present invention will be described below with reference to drawings. FIG. 1 is an explanatory diagram obtained when the light-quantity adjusting apparatus according to this embodiment is applied to a lens barrel (optical apparatus) having a variable-power optical system including convex, concave, convex, and convex lens units, and shows a main section of the lens barrel. This lens barrel is put in a camera body 201 indicated by a dotted line in FIG. 1.

In this embodiment, a configuration in which a lens barrel and a camera body are integrated with each other will be described. However, the present invention will be also applied to a camera system comprising a lens apparatus including the light-quantity adjusting apparatus according to this embodiment and a camera to which the lens apparatus is attached in detachable state.

Reference symbol L1 denotes a first lens unit; L2, a second lens unit which performs a power-varying operation by moving in the direction of an optical axis; L3, a third lens unit which performs a blur correction operation by moving in a plane (in an optical-axis orthogonal plane) orthogonal to the optical axis; and L4 denotes a fourth lens unit which performs a focusing operation by moving in the direction of the optical axis.

Reference numeral 1 denotes a front lens barrel for holding the first lens unit L1; 2, a moving frame for holding the second lens unit L2; and 3, a shift unit for holding the third lens unit L3 and moving the third lens unit L3 in a plane perpendicular to the optical axis. Reference numeral 4 denotes a moving frame for holding the fourth lens unit L4, and reference numeral 5 denotes a rear lens barrel to which an image pickup device 16 such as a CCD and a low pass filter 17 are attached. An object light passing through the lens units L1 to L4 is received by the image pickup device 16 and photoelectrically converted into a signal depending on an amount of received light. An output signal from the image pickup device 16 is subjected to image processing (color processing or the like) and then displayed as a taking image on a display unit 18 set in the camera body 201 or recorded on a recording medium 19.

The front lens barrel 1 and the rear lens barrel 5 support one ends of two guide bars to position the guide bars, respectively. The other guide bar is supported and positioned by the shift unit 3 and the rear lens barrel 5.

The moving frame 2 is movably supported by the guide bar in the direction of the optical axis, and the moving frame 4 is movably supported by the guide bar in the direction of the optical axis. The shift unit 3 is interposed between the rear lens barrel 5 and the front lens barrel 1 such that the shift unit 3 is positioned with respect to the front lens barrel 1.

Reference numeral 9 denotes a light-quantity adjusting apparatus for changing an amount of light being incident on the optical system. As will be described below, the light-quantity adjusting apparatus 9 has two diaphragm blades as a light-blocking member. These diaphragm blades can be moved with respect to a opening formed in the light-quantity adjusting apparatus 9 (these diaphragm blades can be inserted and removed with respect to a light-passing region) by receiving drive force from a drive source, and can change an area of the light-passing region.

The light-quantity adjusting apparatus 9 has an ND filter serving as an optical filter. The ND filter can be moved with respect to the opening (the ND filter can be inserted and removed with respect to a region opposed the light-passing region) by receiving drive force from a drive source as will be described below. The light-quantity adjusting apparatus 9 will be described in detail later.

The rear lens barrel 5 is positioned on the front lens barrel 1 and fixed by three screws from the back of the lens barrel together with the front lens barrel 1.

Reference numeral 10 denotes a lead screw for moving the fourth lens unit L4 (moving frame 4) in the direction of the optical axis to perform a focusing operation. The lead screw 10 is supported at both the ends by the shift unit 3 and a bearing portion arranged on a stepping motor stator unit 11. The stepping motor stator unit 11 is a unit for rotating a rotor magnet 10a coupled with the lead screw 10.

The rotor magnet 10a which is magnetized with multipole magnetization is fixed to one end side (lens barrel rear-end side) of the lead screw 10. The lead screw 10 is engaged with a rack 4a attached to the moving frame 4, and moves the moving frame 4 (fourth lens unit L4) in the direction of the optical axis direction by rotation of the rotor magnet 10a. In addition, a helical torsion spring 4b is arranged near the rack 4a, and the moving frame 4 and the rack 4a are biased by the helical torsion spring 4b to eliminate the loosing of the moving frame 4, the rack 4a, the guide bars, and the lead screw 10.

Reference numeral 12 denotes a lead screw for moving the moving frame 2 (second lens unit L2) in the direction of the optical axis to perform a power varying operation. The lead screw 12 is supported at both the ends by the shift unit 3 and a bearing portion arranged in a stepping motor stator unit 13. The stepping motor stator unit 13 is a unit for rotating a rotor magnet 12a coupled with the lead screw 12.

The rotor magnet 12a which is magnetized with multipole magnetization is fixed to one end side (lens barrel rear-end side) of the lead screw 12. The lead screw 12 is engaged with a rack 2a attached to the moving frame 2, and moves the moving frame 2 (second lens unit L2) in the direction of the optical axis by rotation of the rotor magnet 12a. In addition, a helical torsion spring 2b is arranged near the rack 2a, and the moving frame 2 and the rack 2a are biased by the helical torsion spring 2b to eliminate the loosing of the moving frame 2, the rack 2a, the guide bars, and the lead screw 12.

The stepping motor stator units 11 and 13 are fixed to the rear lens barrel 5 with two screws. Reference numeral 14 denotes a photo interrupter (focus reset switch). The photo interrupter 14 electrically detects a switching operation between light blocking and light passing by a light-blocking portion formed on the moving frame 4 depending on the movement of the moving frame 4 in the direction of the optical axis. A control circuit (not shown) detects a reference position of the fourth lens unit L4 on the basis of an output signal from the photo interrupter 14. The photo interrupter 14 is fixed to the rear lens barrel 5 with one screw through a substrate.

Reference numeral 15 denotes a photo interrupter (zoom reset switch) for electrically detecting a switching operation between light blocking and light passing by a light-blocking portion formed on the moving frame 2 depending on the movement of the moving frame 2 in the direction of the optical axis. A control circuit (not shown) detects a reference position of the second lens unit L2 on the basis of an output signal from the photo interrupter 15. The photo interrupter 15 is fixed to the front lens barrel 1 with one screw through a substrate.

In this case, the configuration of the shift unit 3 for making it possible to move the third lens unit L3 within an orthogonal plane to an optical-axis will be described below.

The third lens unit L3 can be moved in a PITCH direction (the longitudinal direction of the camera 201) to correct image blurring caused by an angular change in the PITCH direction, and can be moved in a YAW direction (the lateral direction of the camera 201) to correct image blurring caused by an angular change in the YAW direction. With movements of the third lens unit L3 in the PITCH direction and the YAW direction, the third lens unit L3 is stopped at an arbitrary position in the orthogonal plane to an optical-axis. In this case, the drives of the third lens unit L3 in the PITCH direction and the YAW direction are performed by two dedicated combinations of drive members and position detection members corresponding on the drives in the PITCH direction and the YAW direction.

The two dedicated combinations of the drive members and the position detection members are only arranged at an angle of 90°. The combinations have the same configurations. Only the combination of the drive member and the position detection member (shown in FIG. 1) for driving the third lens unit L3 in the PITCH direction will be described below.

Reference numeral 3b denotes a shift base serving as a base of the shift unit 3. The shift base 3b is fixed to the front lens barrel 1 and the rear lens barrel 5 to partially constitute the exterior of the lens barrel. Reference numeral 3d denotes a helical compression spring. The helical compression spring 3d consists of a material, e.g., a phosphor bronze wire which is not attracted by a detection magnet 3f and a drive magnet 3j (will be described later) arranged near the helical compression spring 3d. The helical compression spring 3d is arranged in parallel to the optical axis.

Reference numeral 3a denotes a shift lens barrel. The shift lens barrel 3a is a movable member holding the third lens unit L3 serving as a lens unit shifting in the orthogonal plane to an optical-axis. One end of the helical compression spring 3d is held by a V-shaped groove (not shown) formed in the shift lens barrel 3a and positioned.

Reference numeral 31 denotes a ball. The ball 31 is held by the shift base 3b and the shift lens barrel 3a. Although only one ball 31 is shown in FIG. 1, three balls are actually arranged in the orthogonal plane to an optical-axis. As the material of the ball 31, a material that is not attracted by the drive magnet 3j (to be described later) arranged near the ball 31 can be used. For example, SUS304 (austenitic stainless steel) can be preferably used.

Contact surfaces of the ball 31 on the shift lens barrel 3a and the shift base 3b are orthogonal to the optical axis. When the nominal diameters of the three balls 31 are equal to each other, the positions of the contact surfaces in the optical axis direction are made almost equal to each other, so that the third lens unit L3 can be held in a state in which the third lens unit L3 is perpendicular to the optical axis. At the same time, the third lens unit L3 can be moved in the orthogonal plane to an optical-axis while keeping above state.

Reference numeral 3c denotes a sensor base arranged at the rear end side of the shift unit 3. The sensor base 3c is positioned by two positioning pins and fixed to the shift base 3b with three screws. The other end of the helical compression spring 3d is engaged with the sensor base 3c.

The helical compression spring 3d is built between the shift lens barrel 3a and the sensor base 3c such that the helical compression spring 3d is compressed, and biases the shift lens barrel 3a to the shift base 3b through the ball 31. In this case, a lube oil having such a viscosity that the ball 31 does not easily fall from the contact surfaces of the shift base 3b and the shift lens barrel 3a may be applied to the ball 31 or the like. In this manner, inertia force stronger than the biasing force of the helical compression spring 3d acts on the shift lens barrel 3a, the position of the ball 31 can be repressed from being easily shifted even though the ball 31 is not held between the shift base 3b and the shift lens barrel 3a.

A drive mechanism of the shift lens barrel 3a will be described below.

Reference numeral 3j denotes a drive magnet magnetized with two poles in radial directions with respect to the optical axis; 3k, a yoke for closing a magnetic flux in front of the lens barrel on the drive magnet 3j; and 3i, a coil fixed to the shift lens barrel 3a by adhesion. Reference numeral 3h denotes a yoke for closing a magnetic flux on the back of the lens barrel on the drive magnet 3j. The yoke 3h and the drive magnet 3j forms a space in which the coil 3i moves, and the yoke 3h is fixed to the shift base 3b by the magnetic force of the magnet to constitute a magnetic circuit.

When a current is flowed in the coil 3i, Lorentz force by repulsion between magnetic lines generated by the magnet and the coil in a direction almost perpendicular to a magnetization boundary of two pole magnetizations of the drive magnet 3j to move the shift lens barrel 3a. This is a so-called moving coil type drive mechanism.

Since the configurations described above are arranged in the PITCH direction and the YAW direction, respectively, the shift lens barrel 3a can be driven in two directions almost orthogonal to each other. In this case, since the shift lens barrel 3a biased to the shift base 3b by the helical compression spring 3d through the three balls 31 as described above, frictional force serving as a load when the shift lens barrel 3a is driven is only rolling friction of the ball 31. Since this frictional force is very weak, the shift lens barrel 3a can be finely driven and controlled.

A position detection mechanism for the shift lens barrel 3a will be described below.

Reference numeral 3f denotes a detection magnet magnetized with two poles in radial directions with respect to the optical axis; 3g, a yoke for closing a magnetic flux in front of the lens barrel on the detection magnet 3f. The detection magnet 3f and the yoke 3g are fixed to the shift lens barrel 3a. Reference numeral 3e denotes a hall element for converting a magnetic flux density into an electric signal. The hall element 3e is positioned and fixed to the sensor base 3c. These members (the detection magnet 3f, the yoke 3g and the hall element 3e) constitute the position detection mechanism.

In the configuration described above, when the shift lens barrel 3a is driven in the PITCH direction or the YAW direction, a magnetic flux density detected by the hall element 3e changes. The change of the magnetic flux density is detected based on an electric signal output from the hall element 3e by appropriate signal processing, so that the position of the shift lens barrel 3a (third lens unit L3) can be detected.

Figure 2:
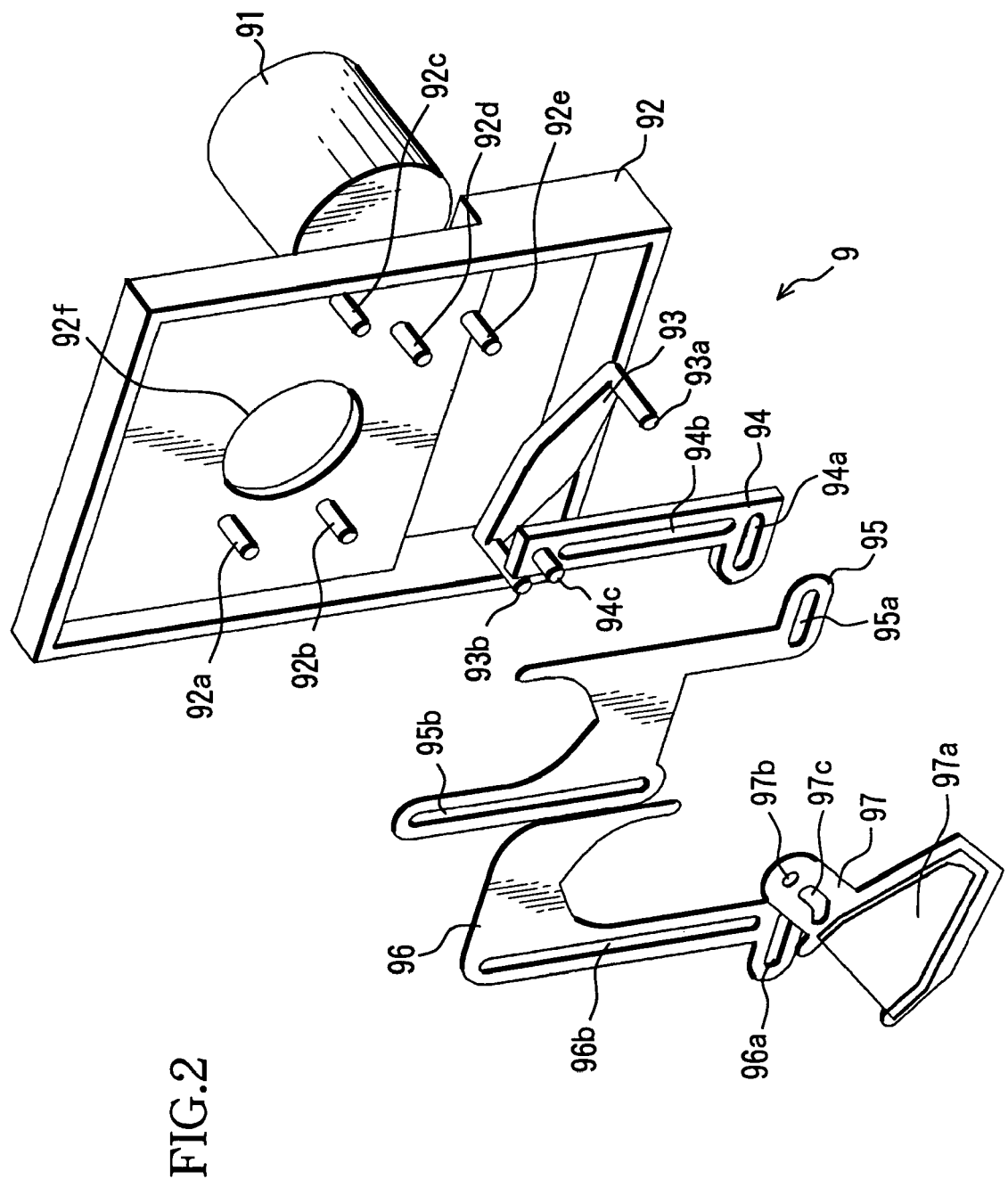
FIG. 2 is an exploded perspective view of a light-quantity adjusting apparatus according to Embodiment 1.
Figure 3:
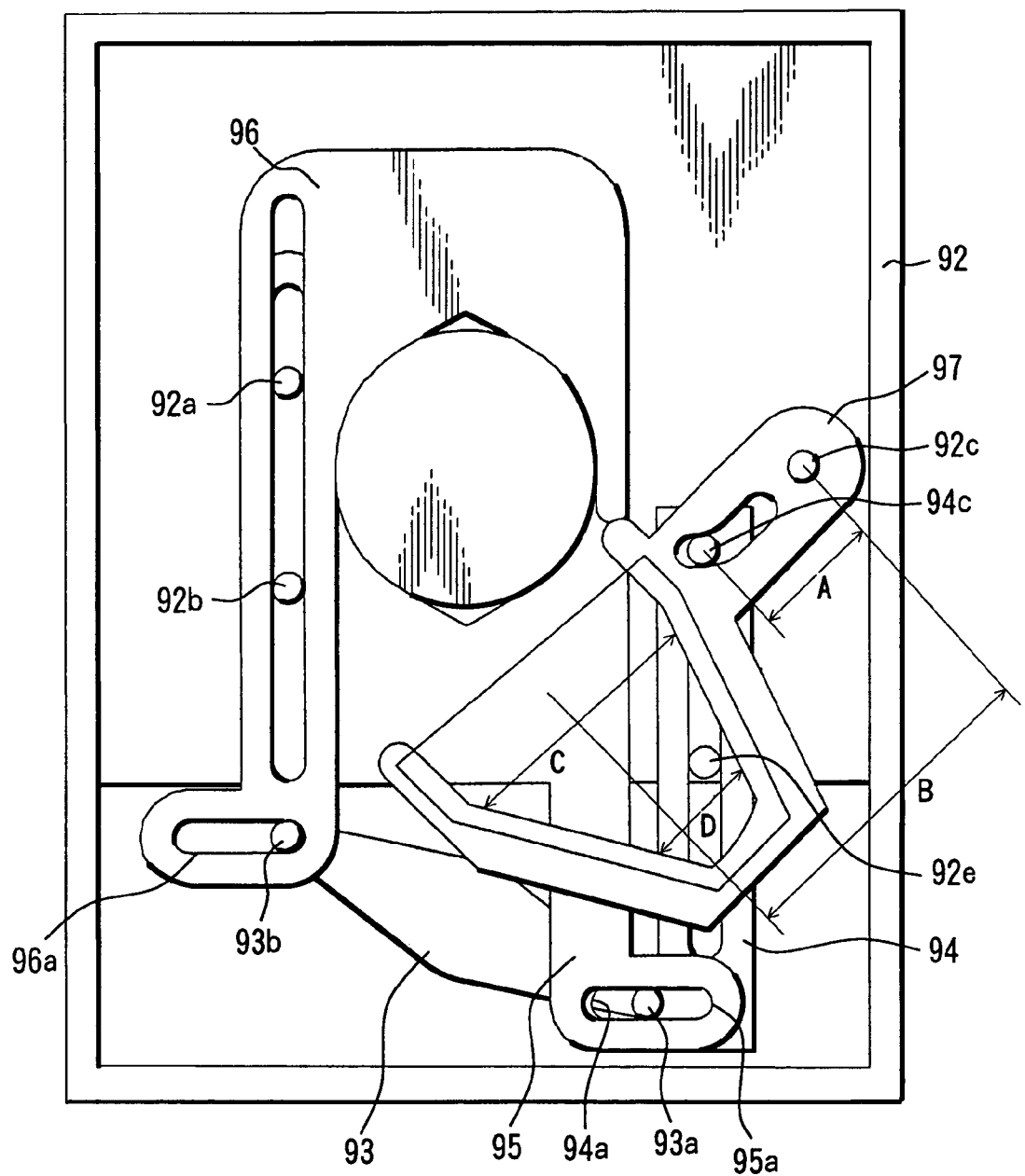
FIG. 3 is a front view of a light-quantity adjusting apparatus according to Embodiment 1.

The structure of the light-quantity adjusting apparatus 9 and a drive mechanism for diaphragm blades and an ND filter will be described below with reference to FIGS. 2 to 4. FIG. 2 is an exploded perspective view of a light-quantity adjusting apparatus, FIG. 3 is a front view of the light-quantity adjusting apparatus, and FIGS. 4(A) to 4(H) are diagrams showing continuously movements of the light-quantity adjusting apparatus when an diaphragm aperture is changed from an open state to a closed state.

A diaphragm blades 95 and 96 are driven through a rotary type electromagnetic actuator (motor) 91 and a seesaw-type diaphragm drive lever 93 serving as a first drive member. A projection portion 93a of the diaphragm drive lever 93 is engaged with a long-hole portion 95a of the diaphragm blade 95, and a projection portion 93b of the diaphragm drive lever 93 is engaged with a long-hole portion 96a of the diaphragm blade 96.

Projection portions 92a and 92b formed on a bottom board (i.e., casing, main body) 92 of the light-quantity adjusting apparatus 9 are engaged with long-hole portions 95b and 96b of the two diaphragm blades 95 and 96. With this configuration, the diaphragm blades 95 and 96 are guided by the projection portions 92a and 92b of the bottom board 92 and reciprocated in the vertical direction (vertical direction in FIG. 3) of the apparatus depending on the rotation of the motor (drive source) 91. In this manner, the diaphragm blades 95 and 96 move with respect to a fixed opening 92f formed in the bottom board 92, so that the area of a light-passing region formed by light passing through the fixed opening 92f can be changed.

As the motor 91, an electromagnetic drive actuator having a permanent magnet rotor formed in a columnar shape or a rotor obtained by magnetizing the outer peripheral surface of a columnar metal member can be used. A change in movement of a magnetic pole on the outer peripheral surface of the rotor is detected by the hall element, and a rotating position and a rotating quantity (rotating angle) of the motor 91 are controlled on the basis of the detection result.

In place of the electromagnetic drive actuator, a stepping motor may be used. When a mechanism for determining the initial positions of the diaphragm blades 95 and 96 is arranged, a diaphragm aperture formed by the diaphragm blades 95 and 96 can be determined depending on the number of steps of signal input the stepping motor (the area of a light-passing region can be changed). For this reason, the hall element is not necessary.

The projection portion 93a of the diaphragm drive lever 93 is engaged with the long-hole portion 95a of the diaphragm blade 95 and engaged with a long-hole portion 94a of a ND drive lever (second drive member) 94. A long-hole portion 94b of the ND drive lever 94 is engaged with projection portions 92d and 92e of the bottom board 92. In the above configuration, when the diaphragm drive lever 93 rotates, the ND drive lever 94 is guided by the projection portions 92d and 92e of the bottom board 92 and reciprocated in the vertical direction (vertical direction in FIG. 3) of the apparatus.

On the other hand, a projection portion 94c of the ND drive lever 94 is engaged with a long-hole portion 97c formed in the proximal end side of the ND blade 97 to which an ND filter 97a is stuck. A hole portion 97b of the ND blade 97 is fitted on a projection portion 92c of the bottom board 92. In this configuration, when the ND drive lever 94 is reciprocated in the vertical direction of the apparatus depending on the rotation of the diaphragm drive lever 93, the ND blade 97 rotates about the projection portion 92c of the bottom board 92.

Forming regions of the ND filter 97a on the ND blade 97, as shown in FIG. 3, are formed such that a horizontal width C in a region which is inserted in the diaphragm aperture (specifically, correspond to a region opposed the diaphragm aperture) first and a horizontal width D of a region which is inserted in the diaphragm aperture second satisfy C>D. More specifically, the forming regions of the ND filter 97a are formed such that the horizontal width of the forming regions gradually decrease from the region which is inserted into the diaphragm aperture first to the region which is inserted into the diaphragm aperture second.

In this embodiment, the ND filter 97a is designed to have a single density. However, the ND filter 97a may be designed to have two different densities to repress small-aperture diffraction. Of the forming regions of the ND filter 97a, the region that is inserted into the diaphragm aperture first may have a first density, and the region that is inserted into the diaphragm aperture second may have a second density higher than the first density. A transparent portion having a transmittance of 100% may be formed in the regions having two or more different densities. The region that is inserted into the diaphragm aperture first is preferably used as the transparent portion. In this embodiment, the diaphragm blades 95 and 96 and the ND blade 97 are driven by the diaphragm drive lever 93 and the ND drive lever 94. However, the diaphragm blades 95 and 96 and the ND blade 97 may be driven by using, e.g., gears or the like.

In this case, as shown in the sequence diagrams of FIGS. 4(A) to 4(H), the region of the ND filter 97a which is inserted into the diaphragm aperture first is inserted into the diaphragm aperture when the area of the diaphragm aperture is relatively large. In contrast to this, the region of the ND filter 97a that is inserted into the diaphragm aperture second is inserted into the diaphragm aperture in a small-aperture state. For this reason, as described above, when the horizontal widths of the ND filter 97a are set to satisfy C>D, the diaphragm aperture can be covered with the minimum region of the ND filter 97a. In this manner, the sizes of the ND blade 97 and the ND filter 97a can be minimized. The light-quantity adjusting apparatus and the optical apparatus comprising the light-quantity adjusting apparatus can be reduced in size and cost.

In the configuration of the light-quantity adjusting apparatus 9, when the motor 91 is rotated, diaphragm operations of the light-quantity adjusting apparatus shown in FIGS. 4(A) to 4(H) are sequentially performed from the open state to the closed state. In the diaphragm operations, a speed at which the ND blade 97 is inserted into the diaphragm aperture (moving speed of the ND blade 97 with respect to the fixed opening 92f) is higher than a moving speed at which the diaphragm blades 95 and 96 move in opposite directions (moving speeds of the diaphragm blades 95 and 96 with respect to the fixed opening 92f). More specifically, in the diaphragm operations, an amount of displacement of the ND blade 97 with respect to the fixed opening 92f depending on a predetermined amount of rotation of the motor 91 is larger than an amount of displacement of the diaphragm blades 95 and 96 with respect to the fixed opening 92f depending on the predetermined amount of rotation of the motor 91.

More specifically, in the configuration of the light-quantity adjusting apparatus 9, since the moving speed of the diaphragm blade 95 is equal to that of the ND drive lever 94, the speed at which the ND blade 97 is inserted into the diaphragm aperture is B/A the speed at which the diaphragm blades 95 and 96 are inserted into the diaphragm aperture (FIG. 3).

As shown in FIG. 3, reference symbol B denotes a distance from the projection portion 92c which is a rotating center of the ND blade 97 to the center of the ND filter 97a in width. Reference symbol A denotes a distance from the projection portion 92c to the projection portion 94c of the ND drive lever 94 corresponding to a point of action used to rotating the ND blade 97. In the above configuration, since the ND drive lever 94 (projection portion 94c) moving at the same speed as that of the diaphragm blades 95 and 96 pushes the proximal end side (long-hole portion 97c) of the ND blade 97, the moving speed of the ND blade 97 is higher than the moving speed of the diaphragm blades 95 and 96. That is, the amount of displacement of the ND blade 97 with respect to the fixed opening 92f is greater than the amount of displacement of the diaphragm blades 95 and 96 with respect to the fixed opening 92f, while the motor 91 is driven by a predetermined amount of rotation.

Figure 4A:
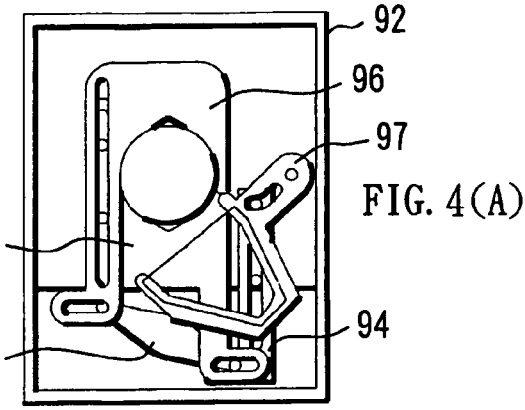
FIGS. 4(A) to 4(H) are explanatory diagrams obtained when an aperture is changed from an open state to a closed state in the light-quantity adjusting apparatus according to Embodiment 1.
Figure 4B:
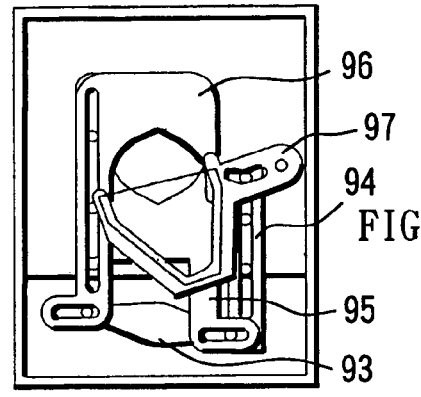
Figure 4C:
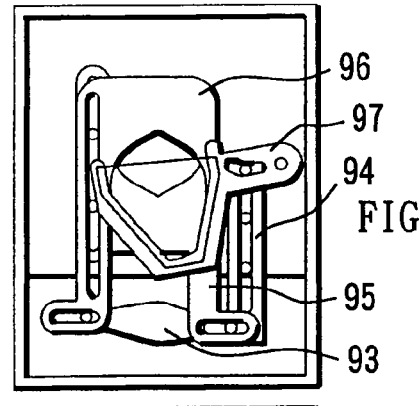
Figure 4D:
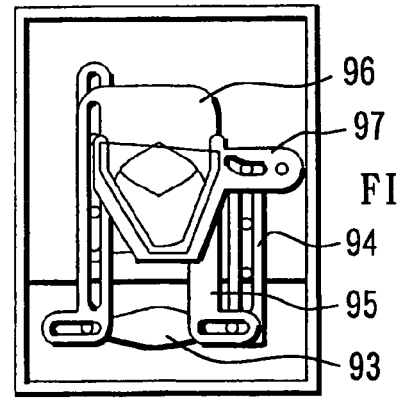
Figure 4E:
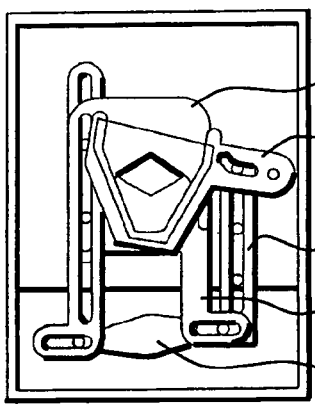
Figure 4F:
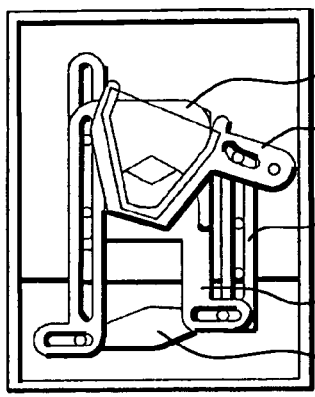
Figure 4G:
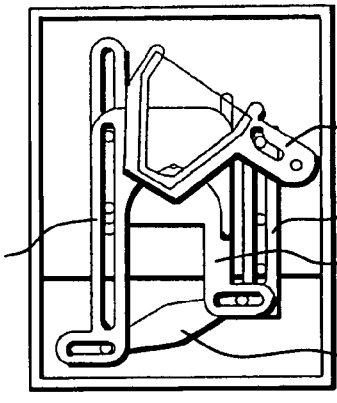
Figure 4H:
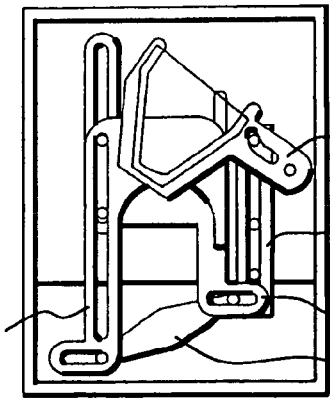

As shown in the diagrams for explaining the diaphragm operation in FIGS. 4(A) to 4(H), the ND filter 97a is inserted into a partial region of the diaphragm aperture regions formed by the diaphragm blades 95 and 96, and so-called "ND half-hanging" states which cause small-aperture diffraction is only states shown in FIGS. 4(B), 4(C), and 4(D). In the other states, the ND filter 97a is completely removed from the diaphragm aperture, or completely covers the diaphragm aperture.

Figure 18:
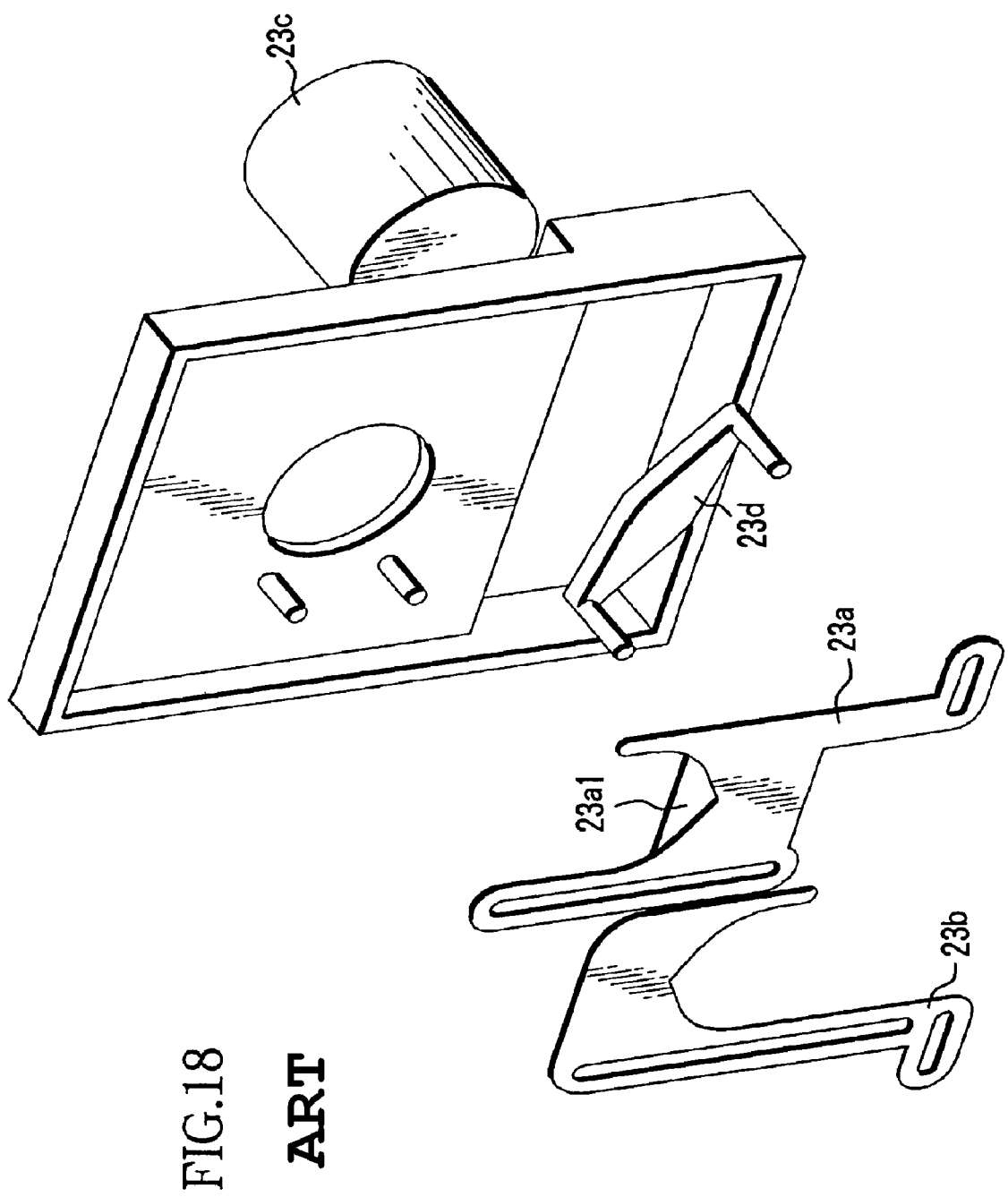
FIG. 18 is an exploded perspective view of a conventional light-quantity adjusting apparatus.
Figure 19:
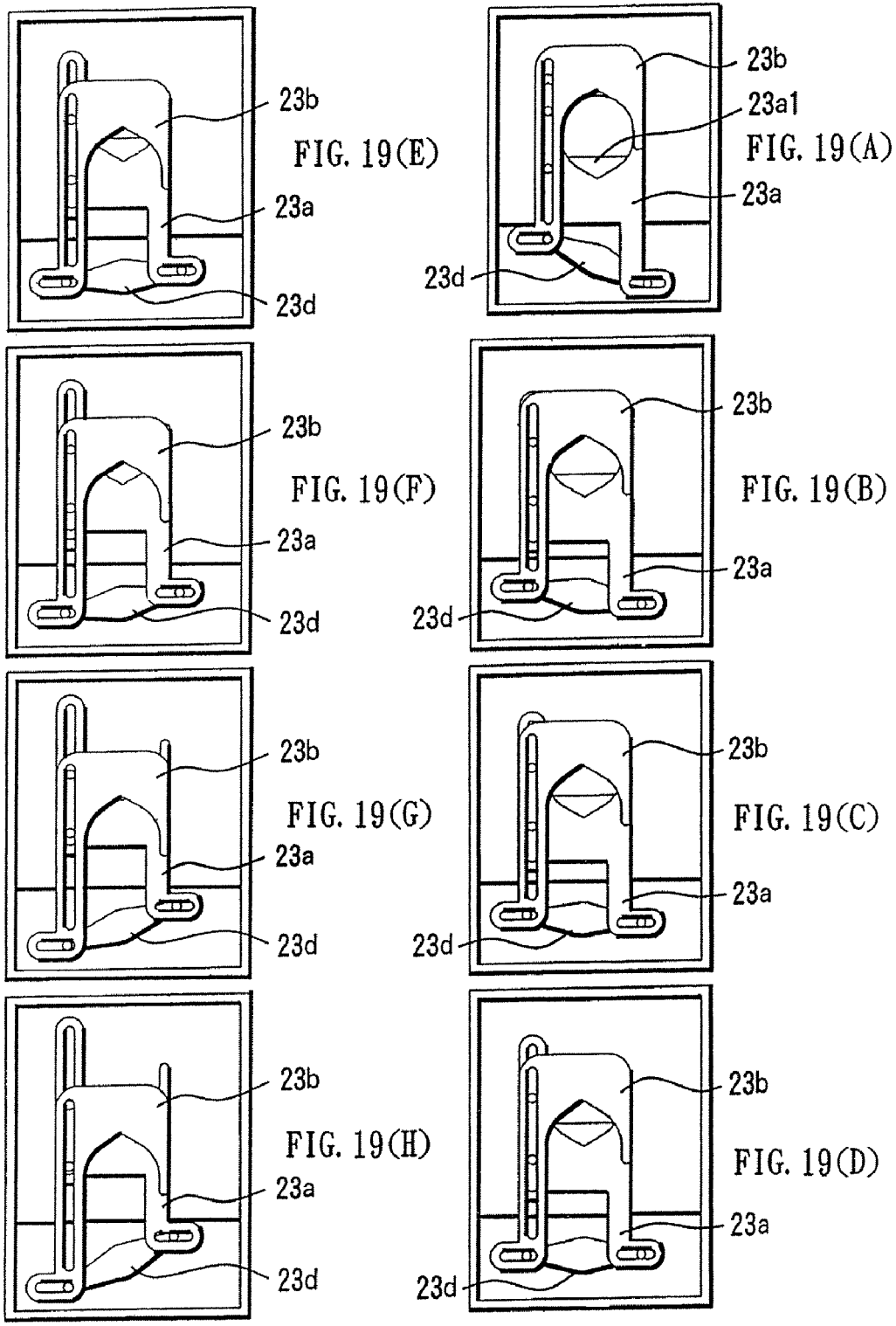
FIGS. 19(A) to 19(H) are explanatory diagrams obtained when an aperture is changed from an open state to a closed state in the conventional light-quantity adjusting apparatus.
Figure 20:
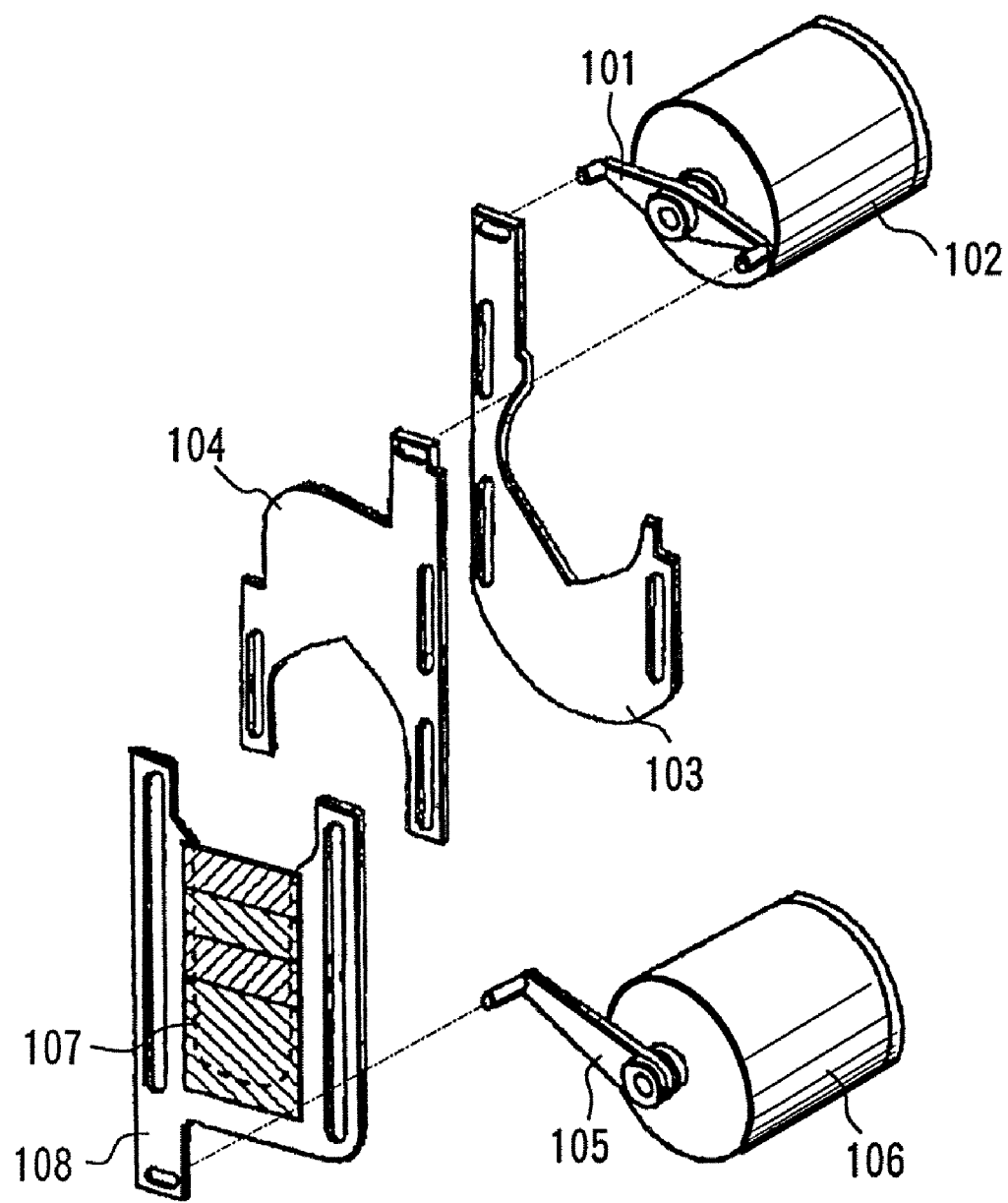
FIG. 20 is an exploded perspective view of a light-quantity adjusting apparatus in which a conventional ND filter is driven by an independent actuator.

The diaphragm operations (FIGS. 4(A) to 4(H)) of the light-quantity adjusting apparatus in this embodiment are compared with the diaphragm operations (FIGS. 19(A) to 19(H)) of a conventional light-quantity adjusting apparatus (FIG. 18) having a structure obtained by sticking an ND filter on a diaphragm blade. In this case, the states shown in FIGS. 4(A) to 4(H) correspond to the states shown in FIGS. 19(A) to 19(H). Rotating angles (amounts of drive of the motors 91 (23c)) of the diaphragm drive lever 93 (23d) in FIGS. 4(A) to 4(H) and FIGS. 19(A) to 19(H) are almost equal to each other.

In the conventional light-quantity adjusting apparatus, the states shown in FIGS. 19(A) to 19(F) are "ND half-hanging" states. On the other hand, in the light-quantity adjusting apparatus in this embodiment, the states shown in FIGS. 4(B) to 4(D) are "ND half-hanging" states. As described above, when the light-quantity adjusting apparatus according to this embodiment is compared with the conventional light-quantity adjusting apparatus, the "ND half-hanging" state is temporary in the light-quantity adjusting apparatus according to this embodiment.

According to the light-quantity adjusting apparatus of this embodiment, since the ND filter 97a quickly covers the diaphragm aperture, in a section in which the aperture diameter is changed, a section in which an MTF is deteriorated by small-aperture diffraction can be made small (a period in which an MTF is deteriorated by small-aperture diffraction can be shortened). More specifically, in comparison with the conventional light-quantity adjusting apparatus shown in FIG. 18, the period of the deterioration of an MTF caused by the small-aperture diffraction can be suppressed to a temporary period. In addition, since the diaphragm blades 95 and 96 and the ND blade 97 can be driven by drive force of one actuator, the number of parts can be made smaller than the number of parts used when diaphragm blades and an ND blade are driven by different actuators. As a result, the light-quantity adjusting apparatus can be reduced in size.

Figure 5:
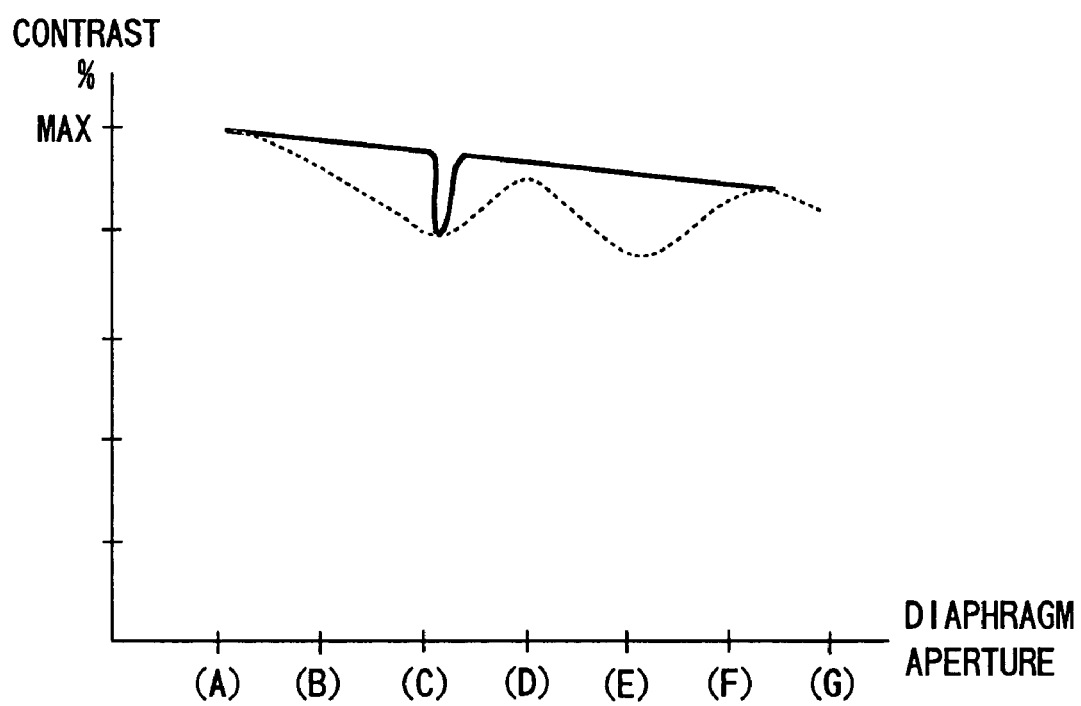
FIG. 5 is a graph showing a change in contrast in a vertical direction depending on a change in diaphragm aperture.

FIG. 5 is a graph showing a change in contrast of an optical image with respect to a change in aperture shape (area of a light-passing region) formed by the diaphragm blades 95 and 96. In FIG. 5, the abscissa indicates the shape of a diaphragm aperture formed by the diaphragm blades 95 and 96. Reference symbols (A) to (G) correspond to FIGS. 4(A) to 4(G), respectively. The ordinate indicates a contrast, at a certain frequency, which is calculated from an output from an image pickup element (CCD) that receives light passing through the optical system in the lens apparatus to photoelectrically convert the light. The MAX value of the contrast of the ordinate changes depending on the types of lenses. In general, the MAX value is 50 to 70%.

A solid line in FIG. 5 is a graph obtained when the light-quantity adjusting apparatus according to this embodiment is used. A dotted line in FIG. 5 is a graph obtained when a conventional light-quantity adjusting apparatus disclosed in Japanese Patent Application Laid-Open No. H11-64923.

In FIG. 5, in the conventional light-quantity adjusting apparatus, a peripheral region including (c) and (e) includes a region (period) in which the contrast falls. In the light-quantity adjusting apparatus according to this embodiment, a region (period) in which the contrast falls is present between (c) and (d). As shown in FIG. 5, the section in which the MTF is deteriorated (the contrast falls) in the section in which the area of the light-passing region changes can be made smaller in the light-quantity adjusting apparatus of this embodiment than that in the conventional light-quantity adjusting apparatus. That is, the time of the section in which the MTF is deteriorated can be shortened. In this manner, when the light-quantity adjusting apparatus according to this embodiment is mounted on an image pickup apparatus or the like, a high-quality image can be obtained.

In the state in which the contrast falls (in the "ND half-hanging" state described above), aperture control which simultaneously uses an electronic shutter function (control of charge accumulation time) of a CCD may be employed without using only a numerical aperture at which the state occurs.

In this embodiment, the long-hole portion 97c of the ND blade 97 is bent. However, the long-hole portion 97c may be a straight hole. As described in this embodiment, since the long-hole portion 97C is bent, only when the diaphragm aperture formed by the diaphragm blades 95 and 96 is almost open or almost closed, i.e., only when small-aperture diffraction is not caused by the ND filter 97a, the moving speed of the ND blade 97 can be reduced. In particular, the moving speed (moving region) of the ND blade 97 obtained when the light-quantity adjusting apparatus 9 changes from the state shown in FIG. 4(F) to the state shown in FIG. 4(H) can be reduced.

In this manner, the rotating angle of the ND blade 97 can be reduced by the reduction in moving speed of the ND blade 97, and the moving region of the ND blade 97 can be reduced in size. For this reason, the light-quantity adjusting apparatus (and the optical apparatus such as a camera) can be reduced in size.

In this embodiment, as described above, a moving speed of the ND blade is B/A times the moving speed of the diaphragm blade. As a concrete numerical value obtained in this case, about 2.5 is obtained.

Embodiment 2

Figure 6:
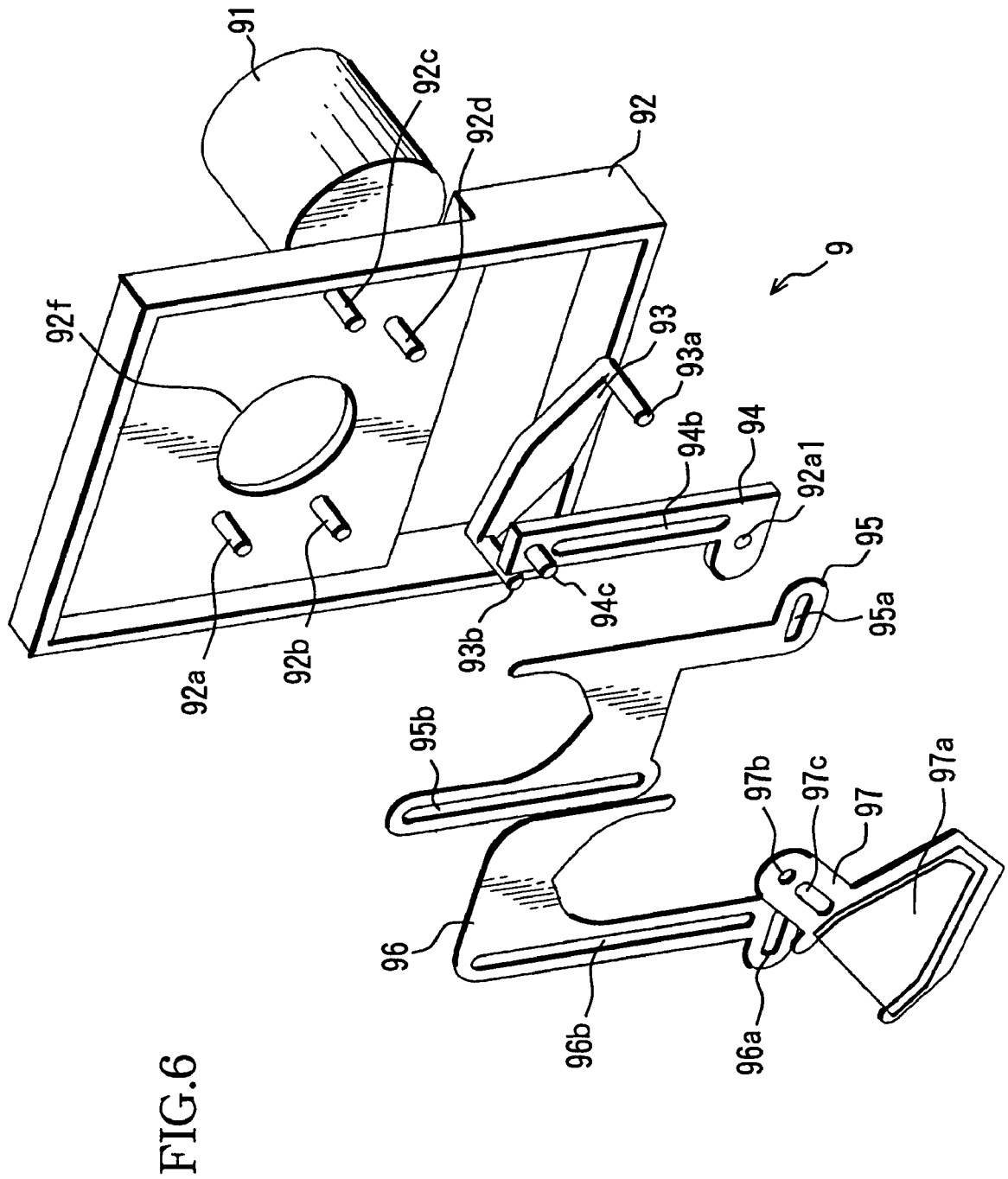
FIG. 6 is an exploded perspective view of a light-quantity adjusting apparatus according to Embodiment 2.
Figure 7:
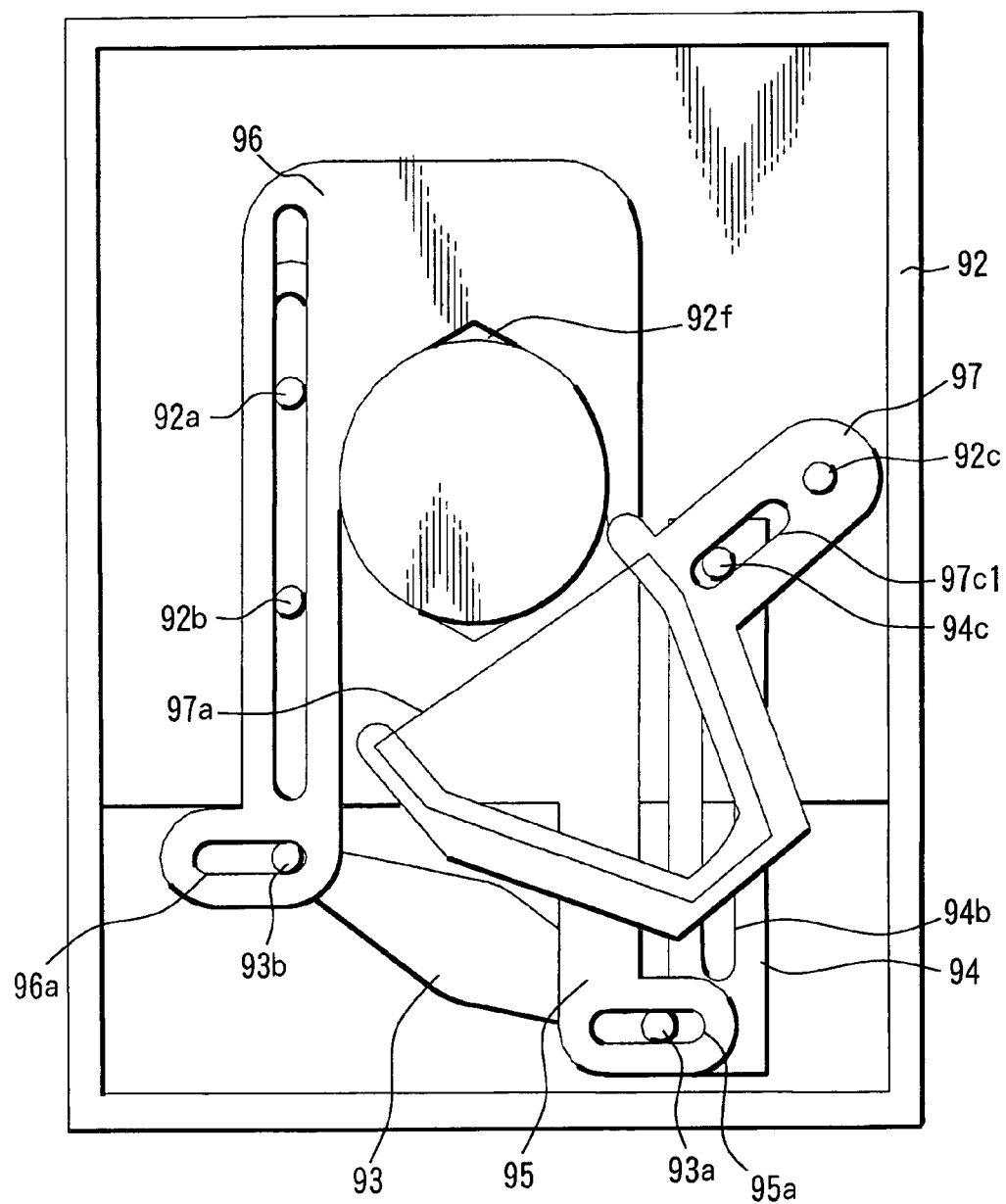
FIG. 7 is a front view of the light-quantity adjusting apparatus according to Embodiment 2.

A light-quantity adjusting apparatus in an optical apparatus according to Embodiment 2 of the present invention will be described below with reference to FIGS. 6 to 8. FIG. 6 is an exploded perspective view of the light-quantity adjusting apparatus, FIG. 7 is a front view of the light-quantity adjusting apparatus, and FIGS. 8(A) to 8(H) are diagrams showing continuously operations of the light-quantity adjusting apparatus when an diaphragm aperture is changed from an open state to a closed state.

The same reference numerals as in Embodiment 1 denote the same parts in Embodiment 2, and a description thereof will be omitted. Like the light-quantity adjusting apparatus according to Embodiment 1, the light-quantity adjusting apparatus according to Embodiment 2 can be mounted on the lens barrel described in Embodiment 1.

A diaphragm blades 95 and 96 are driven through a rotary type electromagnetic actuator (motor) 91 and a seesaw-type diaphragm drive lever 93. A projection portion 93a of the diaphragm drive lever 93 is engaged with a long-hole portion 95a of the diaphragm blade 95, and a projection portion 93b of the diaphragm drive lever 93 is engaged with a long-hole portion 96a of the diaphragm blade 96.

Projection portions 92a and 92b formed on a bottom board (i.e., casing) 92 of a light-quantity adjusting apparatus 9 are engaged with long-hole portions 95b and 96b of the two diaphragm blades 95 and 96. For this reason, the diaphragm blades 95 and 96 are guided by the projection portions 92a and 92b of the bottom board 92 and reciprocated in the vertical direction of the apparatus (vertical direction in FIG. 7) depending on the rotation of the motor 91.

The projection portion 93a of the diaphragm drive lever 93 is engaged with the long-hole portion 95a of the diaphragm blade 95 and engaged with a hole portion 94a1 of an ND drive lever 94. A long-hole portion 94b of the ND drive lever 94 is engaged with a projection portion 92d of the bottom board 92. In the above configuration, when the diaphragm drive lever 93 rotates, the ND drive lever 94 is guided by the projection portion 92d of the bottom board 92 and reciprocated in the vertical direction of the apparatus while being oscillated as shown in FIGS. 8(A) to 8(H).

In FIGS. 8(A) to 8(H), it is assumed that the long-hole direction of the long-hole portion 97c of the ND blade 97 is represented by xN, and that the long hole direction of the long-hole portion 94b of the ND drive lever 94 is represented by xL (x is a to h which correspond to FIGS. 8(A) to 8(H), respectively). In this case, when a relative angle between xN and xL is 90°, the ND blade 97 is driven at the highest speed (the amount of maximum displacement of the ND blade 97 with respect to a fixed opening 92f). In contrast to this, when the relative angle between xN and xL is considerably different from 90° and close to 0° or 180°, the moving speed of the ND blade 97 decreases (displacement amount of the ND blade 97 with respect to the fixed opening 92f decreases).

Figure 8E:
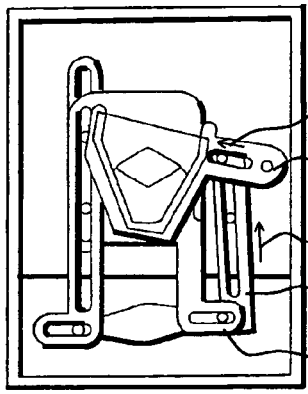
FIGS. 8(A) to 8(H) are explanatory diagrams obtained when an aperture is changed from an open state to a closed state in the light-quantity adjusting apparatus according to Embodiment 2.
Figure 8A:
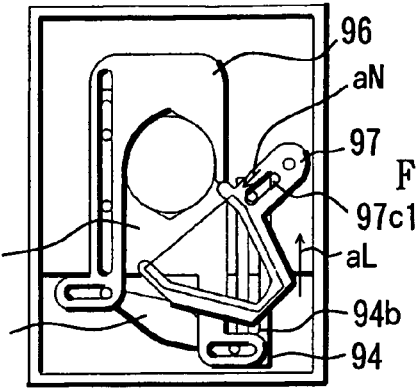
Figure 8F:
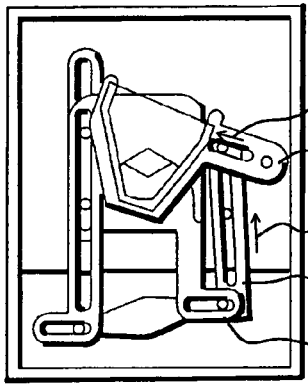
Figure 8B:
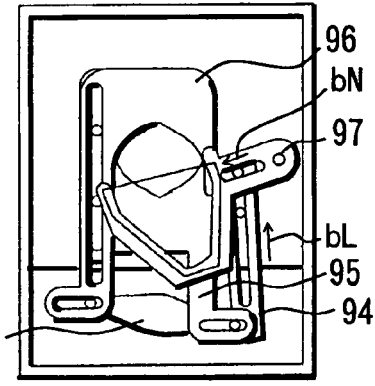
Figure 8G:
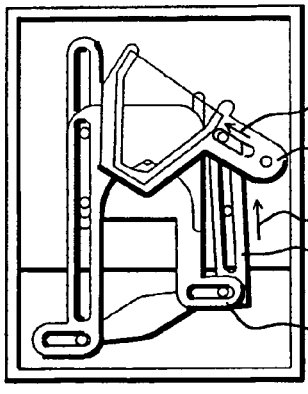
Figure 8C:
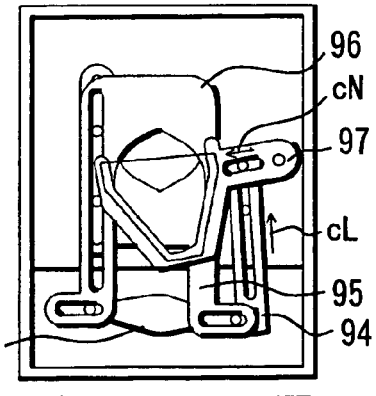
Figure 8H:
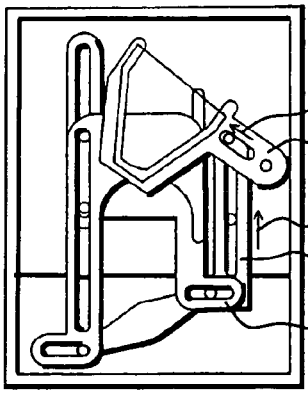
Figure 8D:
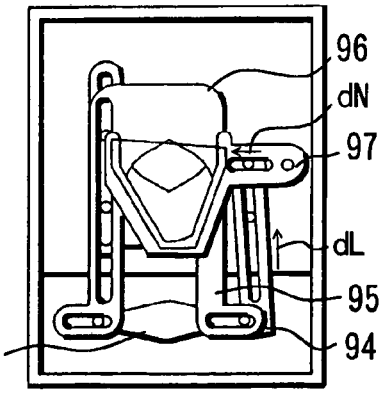

As shown in the diagrams for explaining diaphragm operation in FIGS. 8(A) to 8(H), an "ND half-hanging" state (as described in Embodiment 1) corresponds to only the states shown in FIGS. 8(B), 8(C), and 8(D). In this state, the relative angle between xN and xL is closest to the 90°. In this manner, in the "ND half-hanging" state, when the relative angle between xN and xL is close to 90°, the moving speed of the ND blade 97 can be increased, and an "ND half-hanging" section (section in which an MTF is deteriorated) in a section in which an diaphragm aperture diameter is changed can be made small. That is, time in which the deterioration of the MTF is occurred can be shortened.

On the other hand, when the relative angle between xN and xL is different from 90°, the moving speed of the ND blade 97 decreases, and the rotating angle (moving region) of the ND blade 97 decreases. For this reason, the light-quantity adjusting apparatus (and the optical apparatus such as a camera) can be reduced in size.

According to the light-quantity adjusting apparatus of this embodiment, the diaphragm blades 95 and 96 and the ND blade 97 can be driven by one actuator, and a period of deterioration of the MTF caused by small-aperture diffraction can be suppressed to a short period. In this embodiment, a change in contrast depending on a change in diaphragm aperture exhibits the same result as that of the graph (FIG. 5) described in Embodiment 1.

Embodiment 3

Figure 9:
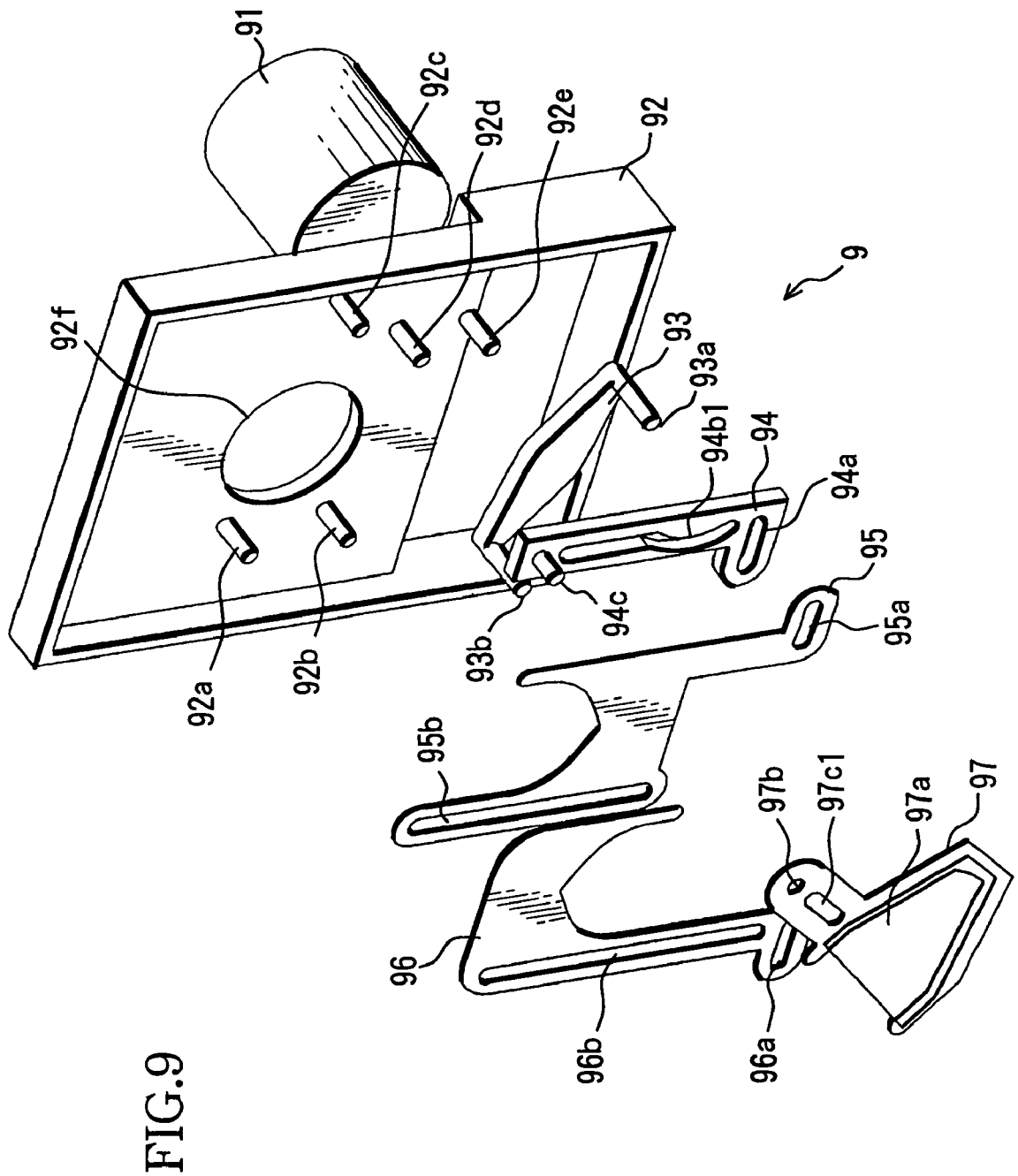
FIG. 9 is an exploded perspective view of a light-quantity adjusting apparatus according to Embodiment 3.
Figure 10:
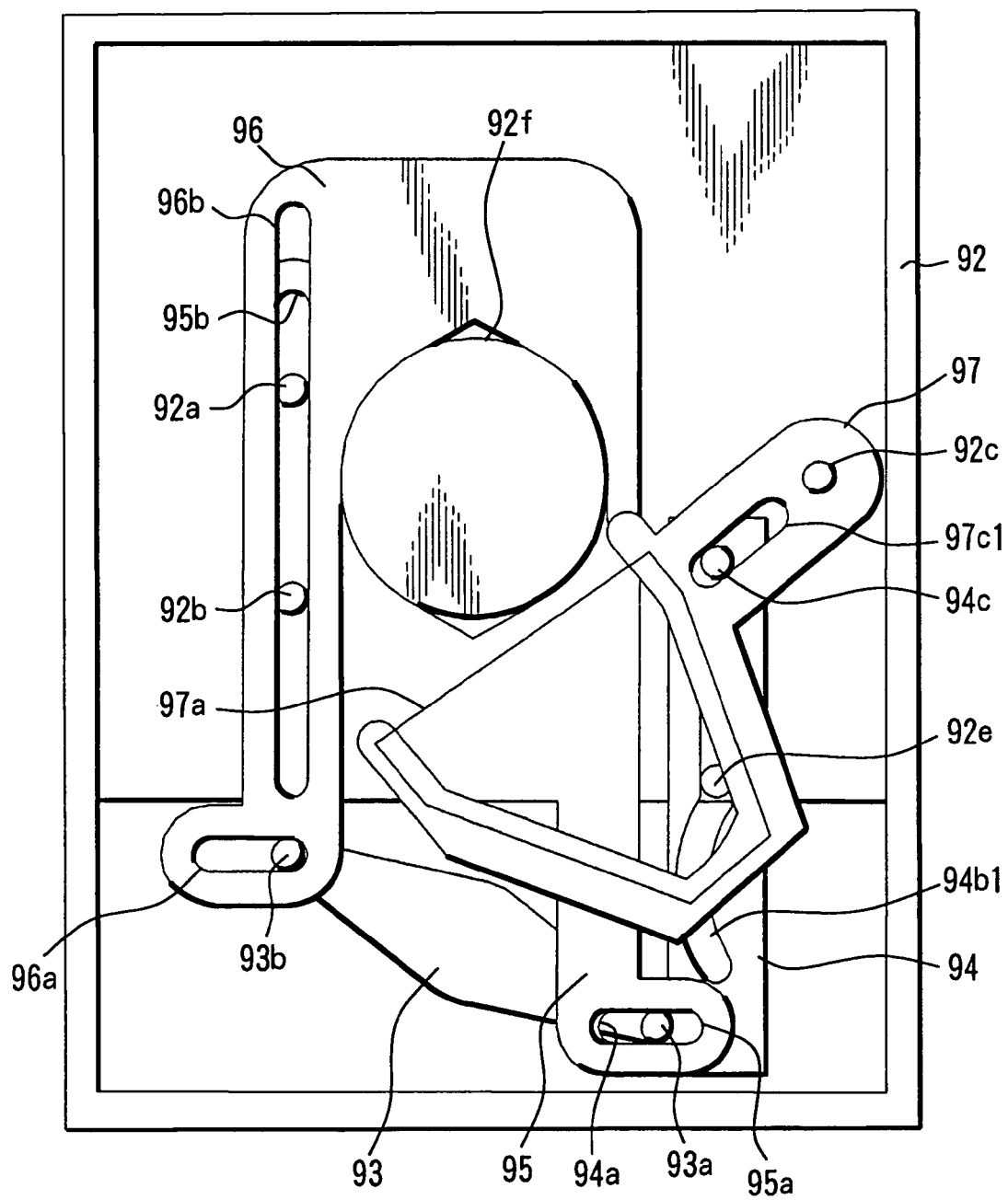
FIG. 10 is a front view of the light-quantity adjusting apparatus according to Embodiment 3.
Figure 11:
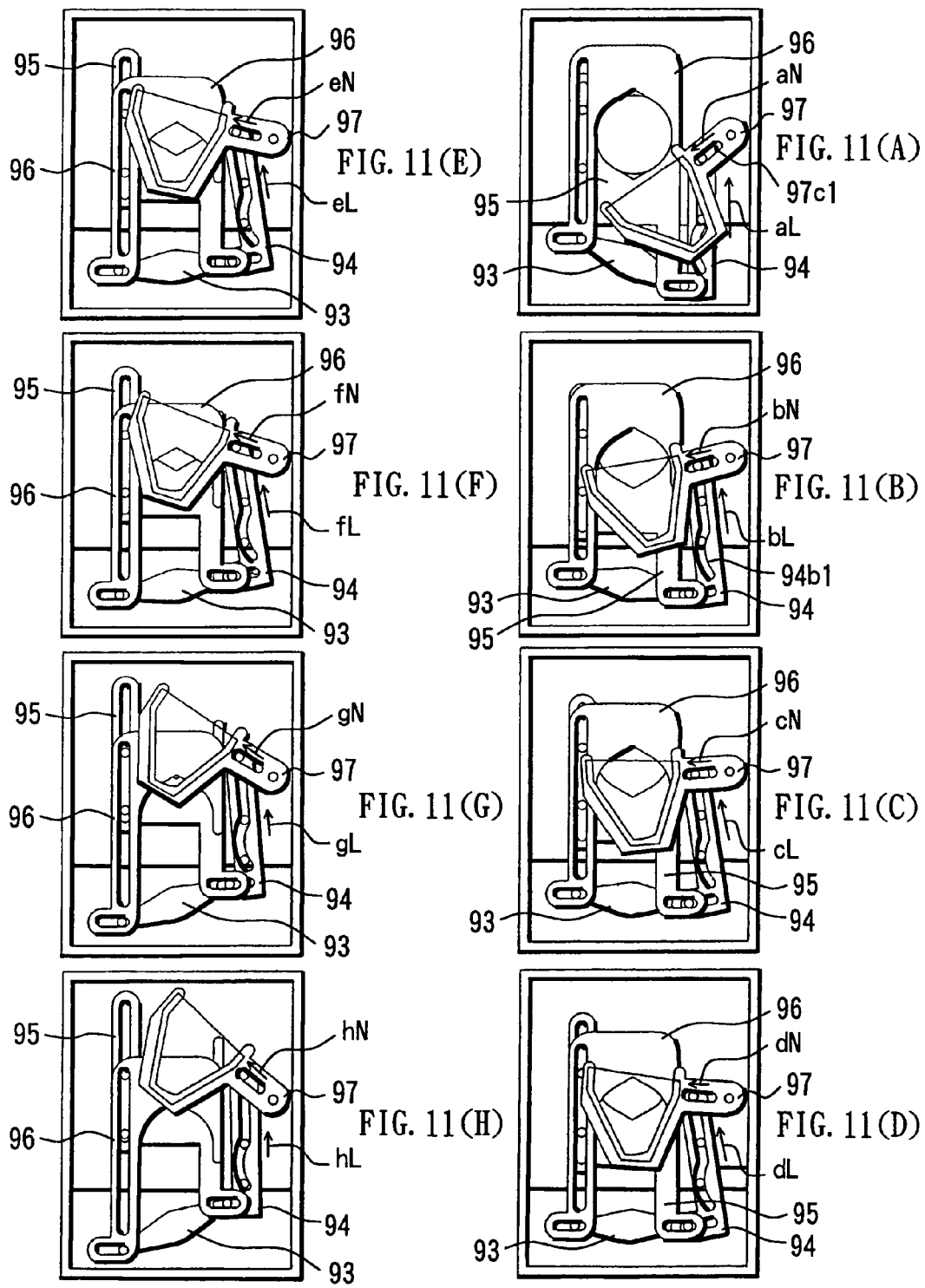
FIGS. 11(A) to 11(H) are explanatory diagrams obtained when an aperture is changed from an open state to a closed state in the light-quantity adjusting apparatus according to Embodiment 3.

A light-quantity adjusting apparatus according to Embodiment 3 of the present invention will be described below with reference to FIGS. 9 to 11. FIG. 9 is an exploded perspective view of the light-quantity adjusting apparatus, FIG. 10 is a front view of the light-quantity adjusting apparatus, and FIGS. 11(A) to 11(H) are diagrams showing continuously operations of the light-quantity adjusting apparatus when a diagram aperture is changed from an open state to a closed state.

The same reference numerals as in Embodiment 1 and Embodiment 2 denote the same parts in Embodiment 3, and a description thereof will be omitted. Like the light-quantity adjusting apparatus according to Embodiment 1, the light-quantity adjusting apparatus according to Embodiment 3 can be mounted on the lens barrel described in Embodiment 1.

A diaphragm blades 95 and 96 are driven through a rotary type electromagnetic actuator (motor) 91 and a seesaw-type diaphragm drive lever 93. A projection portion 93a of the diaphragm drive lever 93 is engaged with a long-hole portion 95a of the diaphragm blade 95, and a projection portion 93b of the diaphragm drive lever 93 is engaged with a long-hole portion 96a of the diaphragm blade 96.

Projection portions 92a and 92b formed on a bottom board (i.e., casing) 92 of a light-quantity adjusting apparatus 9 are engaged with long-hole portions 95b and 96b of the two diaphragm blades 95 and 96. For this reason, the diaphragm blades 95 and 96 are guided by the projection portions 92a and 92b of the bottom board 92 and reciprocated in the vertical direction of the apparatus (vertical direction in FIG. 10) depending on the rotation of the motor 91.

The projection portion 93a of the diaphragm drive lever 93 is engaged with the long-hole portion 95a of the diaphragm blade 95 and also engaged with a hole portion 94a of an ND drive lever 94. A long-hole portion 94b1 of the ND drive lever 94 is engaged with projection portions 92d and 92e of the bottom board 92. The part of the long-hole portion 94b1 is formed as a curvilinear cam. In the above configuration, when the diaphragm drive lever 93 rotates, the ND drive lever 94 is guided by the projection portions 92d and 92e of the bottom board 92 and reciprocated in the vertical direction of the apparatus while being oscillated as shown in FIGS. 11(A) to 11(H).

In FIGS. 11(A) to 11(H), it is assumed that the long-hole direction of a long-hole portion 97c1 of the ND blade 97 is represented by xN, and that the long hole direction of the long-hole portion 94b1 of the ND drive lever 94 is represented by xL (x is A to H which correspond to FIGS. 11(A) to 11(H), respectively). In this case, when a relative angle between xN and xL is 90°, the ND blade 97 is driven at the highest speed. That is, a displacement amount of the ND blade 97 with respect to the fixed opening 92f is larger than a displacement amount of the diaphragm blades 95 and 96 with respect to the fixed opening 92f, while the motor 91 is driven by a predetermined amount. In contrast to this, when the relative angle between xN and xL is considerably different from 90° and close to 0° or 180°, the moving speed of the ND blade 97 decreases.

As shown in the diagrams for explaining the diaphragm operation in FIGS. 11(A) to 11(H), an "ND half-hanging" state as described in Embodiment 1 corresponds to only the states shown in FIGS. 11(B) and 11(C). In this state, the relative angle between xN and xL is closest to the 90°. In this manner, in the "ND half-hanging" state, when the relative angle between xN and xL is close to 90°, the moving speed of the ND blade 97 can be increased, and an "ND half-hanging" section (section in which an MTF is deteriorated) in a section in which a diaphragm aperture diameter is changed can be made small. In this embodiment, a change in contrast depending on a change in diaphragm aperture exhibits the same result as that of the graph (FIG. 5) described in Embodiment 1.

On the other hand, when the relative angle between xN and xL is different from 90°, the moving speed of the ND blade 97 decreases, and the rotating angle (moving region) of the ND blade 97 decreases. For this reason, the light-quantity adjusting apparatus (and the optical apparatus such as a camera) can be reduced in size.

According to the light-quantity adjusting apparatus of this embodiment, the diaphragm blades 95 and 96 and the ND blade 97 can be driven by one actuator 91, and a period of deterioration of the MTF caused by small-aperture diffraction can be suppressed to a short period.

Embodiment 4

Figure 12:
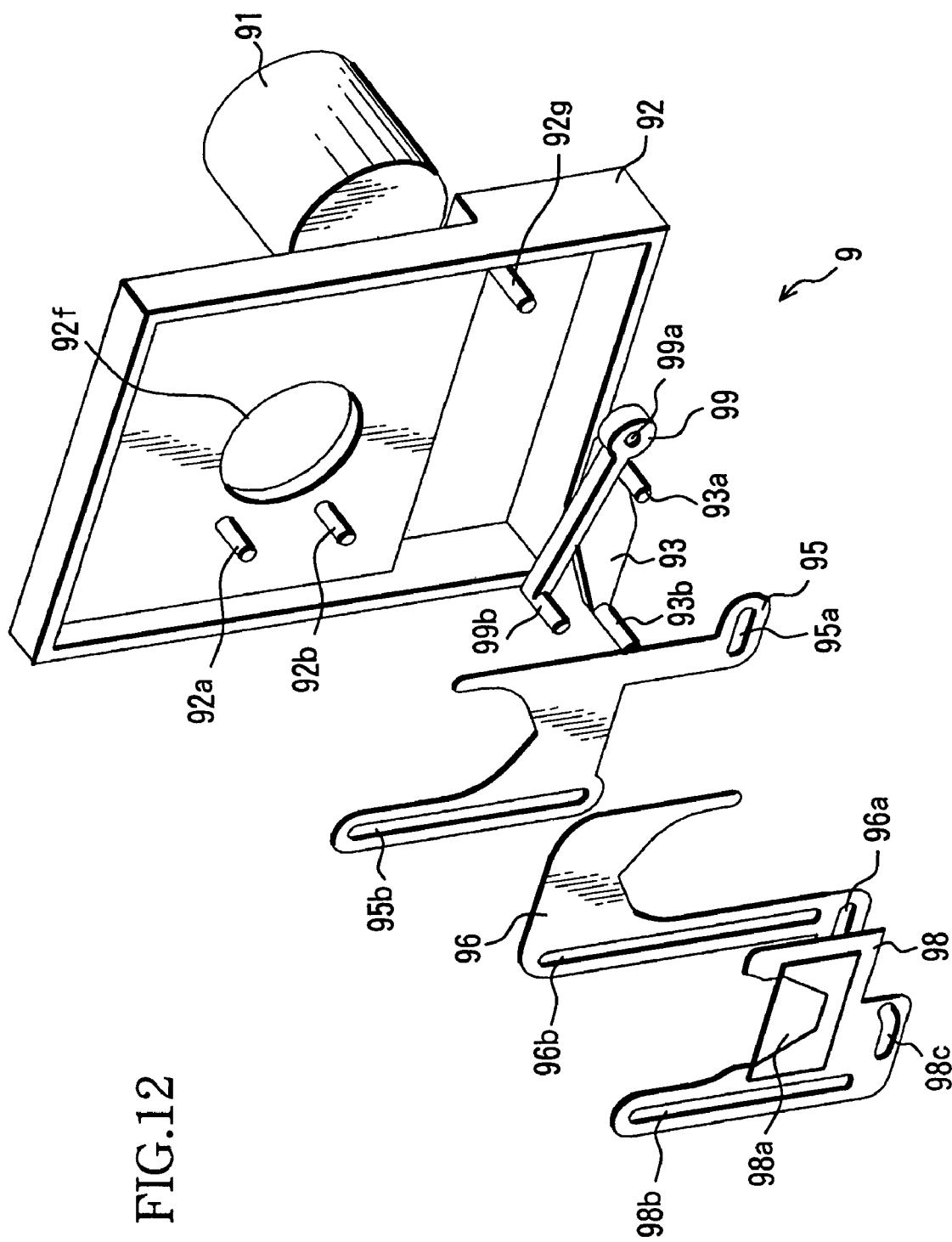
FIG. 12 is an exploded perspective view of a light-quantity adjusting apparatus according to Embodiment 4.
Figure 13:
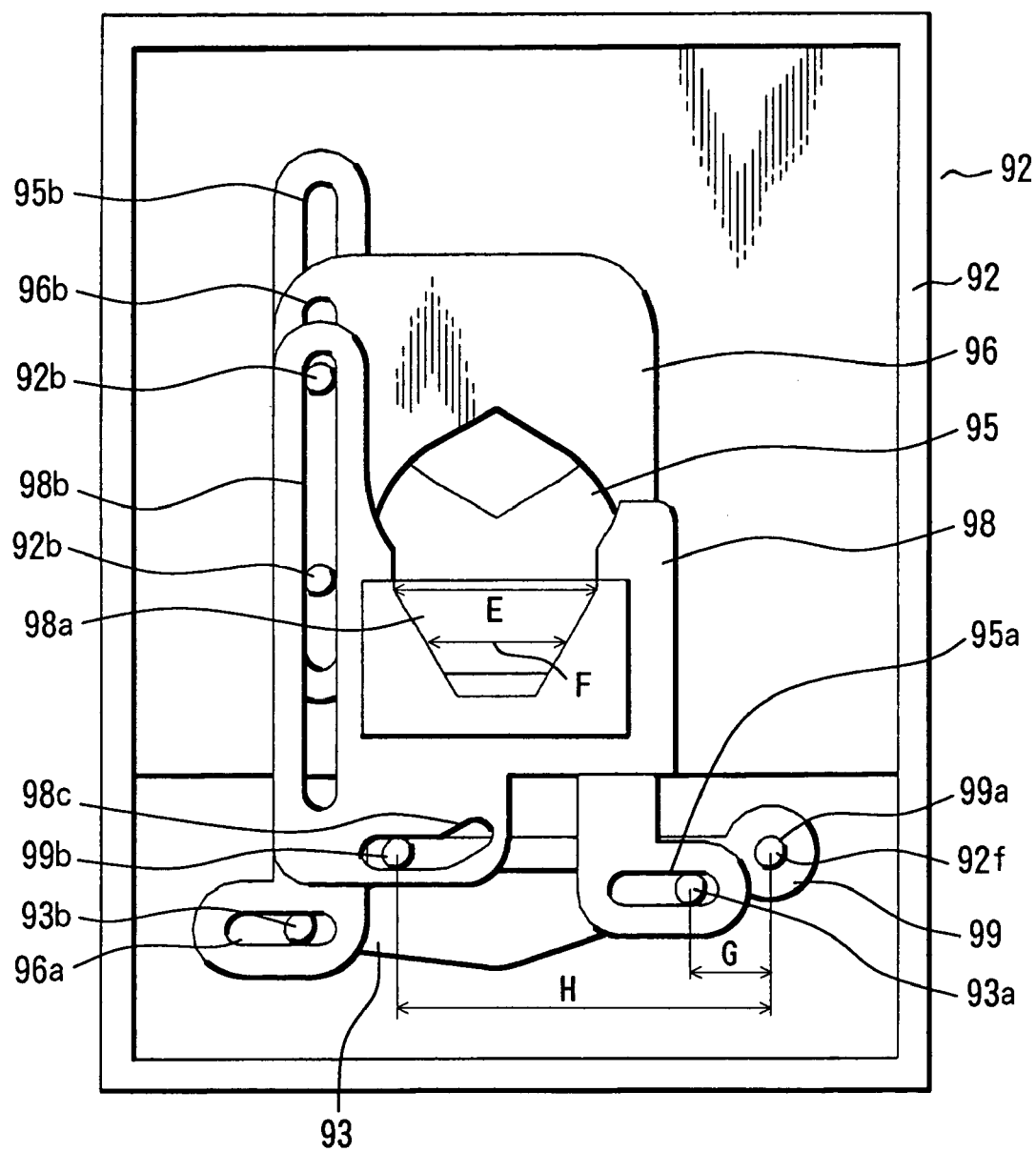
FIG. 13 is a front view of the light-quantity adjusting apparatus according to Embodiment 4.

A light-quantity adjusting apparatus according to Embodiment 4 of the present invention will be described below with reference to FIGS. 12 to 14. FIG. 12 is an exploded perspective view of the light-quantity adjusting apparatus, FIG. 13 is a front view of the light-quantity adjusting apparatus, and FIGS. 14(A) to 14(H) are diagrams showing continuously operations of the light-quantity adjusting apparatus when a diaphragm aperture is changed from an open state to a closed state.

The same reference numerals as in Embodiment 1 denote the same parts in Embodiment 4, and a description thereof will be omitted. Like the light-quantity adjusting apparatus according to Embodiment 1, the light-quantity adjusting apparatus according to Embodiment 4 can be mounted on the lens barrel described in Embodiment 1.

A diaphragm blades 95 and 96 are driven through a rotary type electromagnetic actuator (motor) 91 and a seesaw-type diaphragm drive lever 93. A projection portion 93a of the diaphragm drive lever 93 is engaged with a long-hole portion 95a of the diaphragm blade 95, and a projection portion 93b of the diaphragm drive lever 93 is engaged with a long-hole portion 96a of the diaphragm blade 96.

A projection portions 92a and 92b formed on a bottom board (i.e., casing) 92 of a light-quantity adjusting apparatus 9 are engaged with long-hole portions 95b and 96b of the two diaphragm blades 95 and 96. For this reason, the diaphragm blades 95 and 96 are guided by the projection portions 92a and 92b of the bottom board 92 and reciprocated in the vertical direction of the apparatus. (vertical direction in FIG. 13) depending on the rotation of the motor 91.

As the motor 91, an electromagnetic drive actuator having a permanent magnet rotor formed in a columnar shape or a rotor obtained by magnetizing the outer peripheral surface of a columnar metal member can be used. A change in movement of a magnetic pole on the outer peripheral surface of the rotor is detected, and a rotating position and a rotating quantity (rotating angle) of the motor 91 are controlled on the basis of the detection result.

In place of the electromagnetic drive actuator, a stepping motor may be used. In this case, when a mechanism for determining the initial positions of the diaphragm blades 95 and 96 is arranged, a diaphragm aperture formed by the diaphragm blades 95 and 96 can be determined depending on the number of steps of signal input the stepping motor. For this reason, the hall element is not necessary.

The projection portion 93a of the diaphragm drive lever 93 is brought into contact with an ND drive lever 99 serving as a second drive member in the middle of rotation of the diaphragm drive lever 93. A hole portion 99a of the ND drive lever 99 is fitted on a projection portion 92g of the bottom board 92, and the ND drive lever 99 can be rotated about the projection portion 92g. A projection portion 99b of the ND drive lever 99 is engaged with a long-hole portion 98c of a ND blade 98.

The ND drive lever 99 is counterclockwise energized around the projection portion 92g by a spring (not shown) in FIG. 13. When the projection portion 93a of the diaphragm drive lever 93 is not in contact with the ND drive lever 99, the ND drive lever 99 is in contact with a stopper (not shown). The long-hole portion 98b of the ND blade 98 is engaged with the projection portions 92a and 92b of the bottom board 92. When the ND drive lever 99 is rotated about the projection portion 92g of the bottom board 92, the ND blade 98 on which an ND filter 98a is stuck is reciprocated in the vertical direction of the apparatus (vertical direction in FIG. 13).

A forming region for the ND filter 98a on the ND blade 98, as shown in FIG. 13, is designed such that a horizontal width E in a region which is inserted into the diaphragm aperture first and a horizontal width F in a region which is inserted in the diaphragm aperture second satisfy E>F. More specifically, the forming region for the ND filter 98a is formed such that the horizontal widths gradually decrease from the region which is inserted into the diaphragm aperture first to the region which is inserted into the diaphragm aperture second.

In this embodiment, the ND filter 98a is designed to have a single density. However, in order to suppress small-aperture diffraction, the ND filter 98a may be designed to have two or more different densities. The one region of the forming region for the ND filter 98a that is inserted into the diaphragm aperture first may have a first density, and the other region that is inserted into the diaphragm aperture second may have a second density higher than the first density. A transparent portion having a transmittance of 100% may be formed in the regions having two or more different densities. The region that is inserted into the diaphragm aperture first is preferably used as the transparent portion. In this embodiment, the diaphragm blades 95 and 96 and the ND blade 98 are driven by the diaphragm drive lever 93 and the ND drive lever 99. However, the diaphragm blades 95 and 96 and the ND blade 98 may be driven by using, e.g., gears or the like.

In this case, as shown in the diagrams of FIGS. 14(A) to 14(H), the region of the ND filter 98a which is inserted into the diaphragm aperture first is inserted into the diaphragm aperture when the diaphragm aperture area is relatively large. In contrast to this, the region of the ND filter 98a that is inserted into the diaphragm aperture second is inserted into the diaphragm aperture in a small-aperture state. For this reason, as described above, when the horizontal widths of the ND filter 98a are set to satisfy E>F, the diaphragm aperture can be covered with the minimum region of the ND filter 98a. In this manner, the sizes of the ND blade 98 and the ND filter 98a can be minimized. The light-quantity adjusting apparatus (and the optical apparatus such as a camera) can be reduced in size and cost.

In the configuration of the light-quantity adjusting apparatus 9, when the motor 91 is rotated, diaphragm operations shown in FIGS. 14(A) to 14(H) are sequentially performed from the open state to the closed state. In this diaphragm operation of the light-quantity adjusting apparatus, the ND drive lever 99 is held at positions shown in FIGS. 14(A) and 14(B) by a spring (not shown) and a stopper (not shown) until the projection portion 93a of the diaphragm e drive lever 93 is brought into contact with the ND drive lever 99.

Figure 14E:
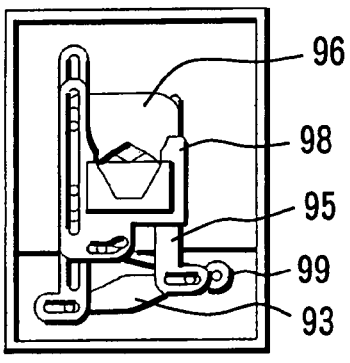
FIGS. 14(A) to 14(H) are explanatory diagrams obtained when an aperture is changed from an open state to a closed state in the light-quantity adjusting apparatus according to Embodiment 4.
Figure 14A:
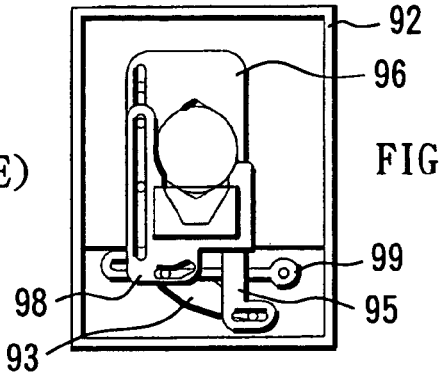
Figure 14F:
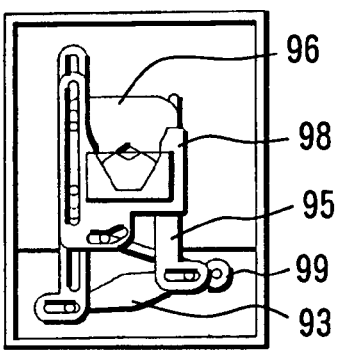
Figure 14B:
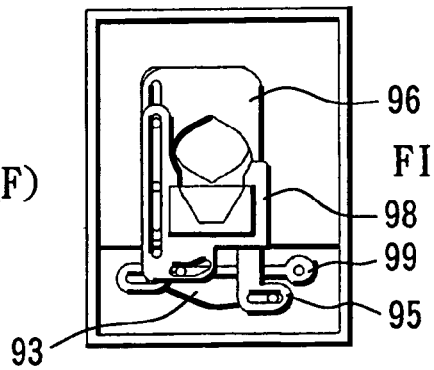
Figure 14G:
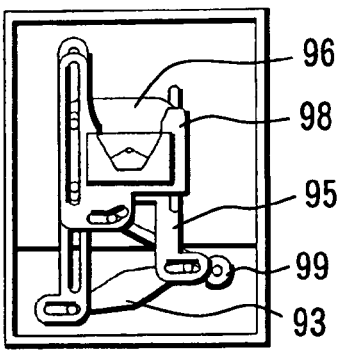
Figure 14C:
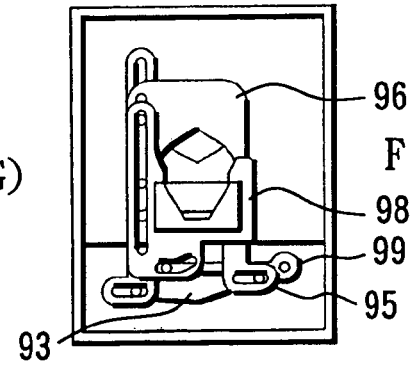
Figure 14H:
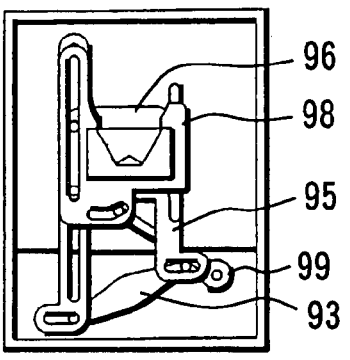
Figure 14D:
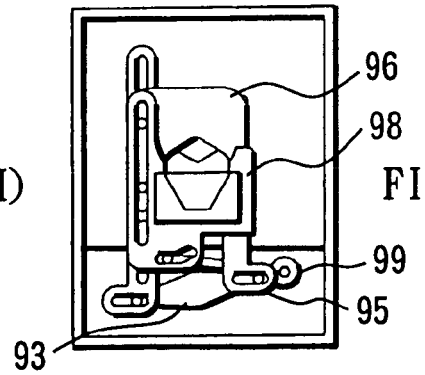

In the states shown in FIGS. 14(A) and 14(B), the diaphragm drive lever 93 and the ND drive lever 99 are not in contact with each other, so that only the diaphragm blades 95 and 96 are driven depending on an amount of rotation of the diaphragm drive lever 93. Thereafter, in the state shown in FIG. 14(C), the projection portion 93a of the diaphragm drive lever 93 is in contact with the ND drive lever 99 at the first time, and the ND drive lever 99 is rotated about the projection portion 92g. Since the ND drive lever 99 is rotated until the diaphragm blades 95 and 96 are closed, the ND blade 98 is driven depending on the rotation of the ND drive lever 99 in such a direction that the ND filter 98a covers the diaphragm aperture.

As shown in FIG. 13, a distance H indicates a distance from the projection portion 92g of the bottom board 92 about which the ND drive lever 99 is rotated to the projection portion 99b of the ND drive lever 99 engaged with a long-hole portion 98c of the ND blade 98. A distance G indicates a distance from the projection portion 92g to the projection portion 93a of the diaphragm drive lever 93 corresponding to a point of action for rotating the ND drive lever 99. In the above configuration, since the diaphragm drive lever 93 for driving the diaphragm blades 95 and 96 pushes the proximal end side of the ND drive lever 99, the moving speed of the ND blade 98 is higher than the moving speed of the diaphragm blades 95 and 96.

At this time, as in Embodiment 1, a speed at which the ND blade 98 is inserted into the diaphragm aperture is H/G times a speed at which the diaphragm blades 95 and 96 move in opposite directions (FIG. 13).

In the light-quantity adjusting apparatus according to this embodiment, the speed at which the ND blade 98 is inserted into the diaphragm aperture is H/G times the rate at which the area of the diaphragm aperture is changed by the movement of the diaphragm blades 95 and 96. For this reason, due to the same reason as that of Embodiment 1, a section in which an MTF is deteriorated by small-aperture diffraction in a section in which a diaphragm aperture diameter is changed can be made small (time of the deterioration section is shortened). In this embodiment, a change in contrast depending on a change in diaphragm aperture exhibits the same result as that of the graph (FIG. 5) described in Embodiment 1.

In this embodiment, the ND drive lever 99 and the ND blade 98 are driven from only a halfway stage (stage in which the diaphragm aperture formed by the diaphragm blades 95 and 96 causes small-aperture diffraction) of the whole rotating angle of the diaphragm drive lever 93. For this reason, the moving region of the ND blade 98 can be made small, and the light-quantity adjusting apparatus 9 can be reduced in size.

On the other hand, in this embodiment, the long-hole portion 98c of the ND blade 98 is bent. However, the long-hole portion 98c may be a straight hole. As described in this embodiment, since the long-hole portion 98c is bent, only when the diaphragm aperture formed by the diaphragm blades 95 and 96 is almost close, and the ND filter 98a completely covers the diaphragm aperture and then the light-quantity adjusting apparatus 9 is in a state in which small-aperture diffraction caused by the ND filter does not occur, the moving speed of the ND blade 98 can be decreased. In this manner, since the rotating angle (moving region) of the ND blade 98 decreases, the light-quantity adjusting apparatus (and an optical apparatus such as a camera) can be reduced in size.

In this embodiment, the moving speed of the ND blade is H/G times the moving speed of the diaphragm blade. As a concrete numerical value obtained in this case, about 4.7 is obtained.

Embodiment 5

Figure 15:
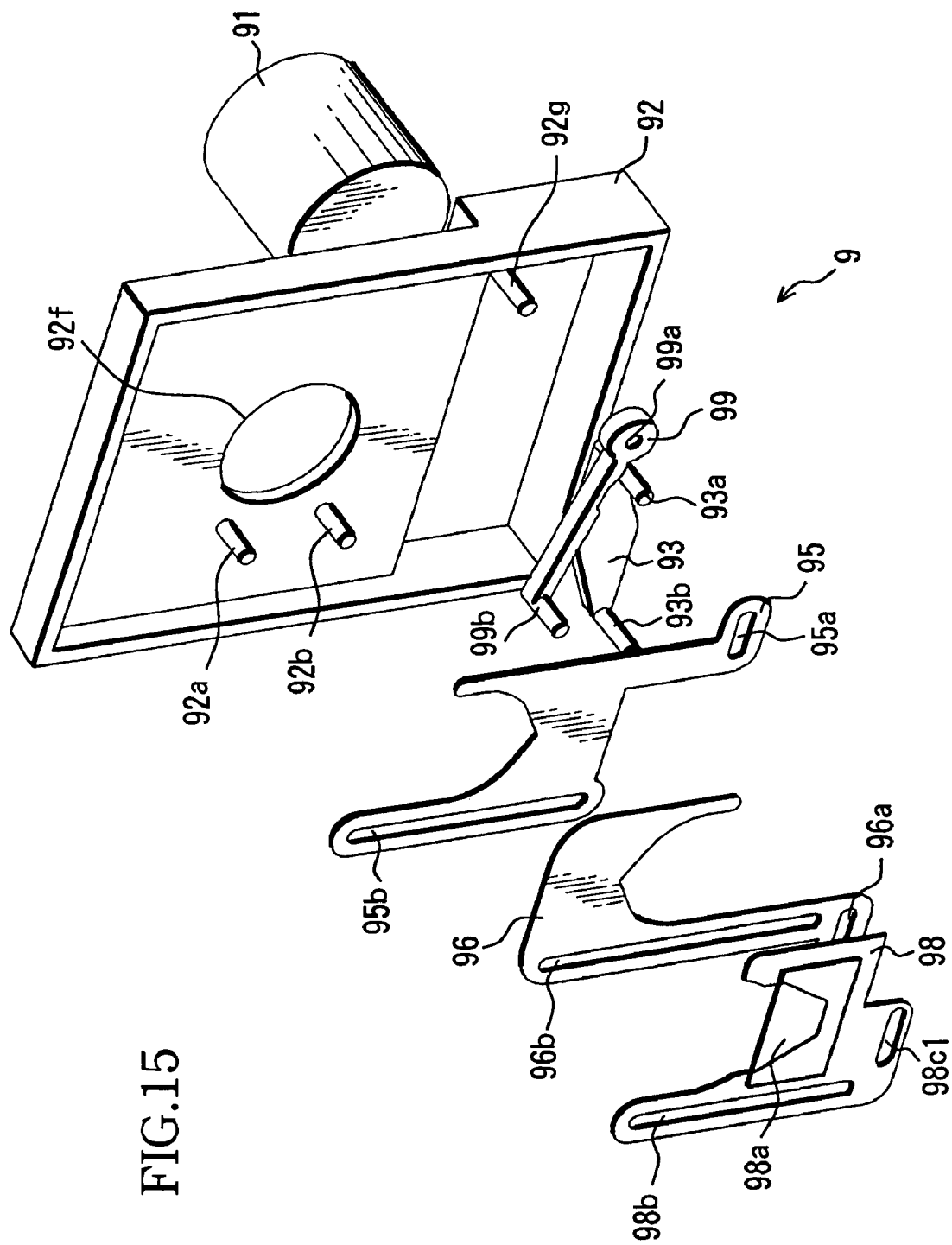
FIG. 15 is an exploded perspective view of a light-quantity adjusting apparatus according to Embodiment 5.
Figure 16:
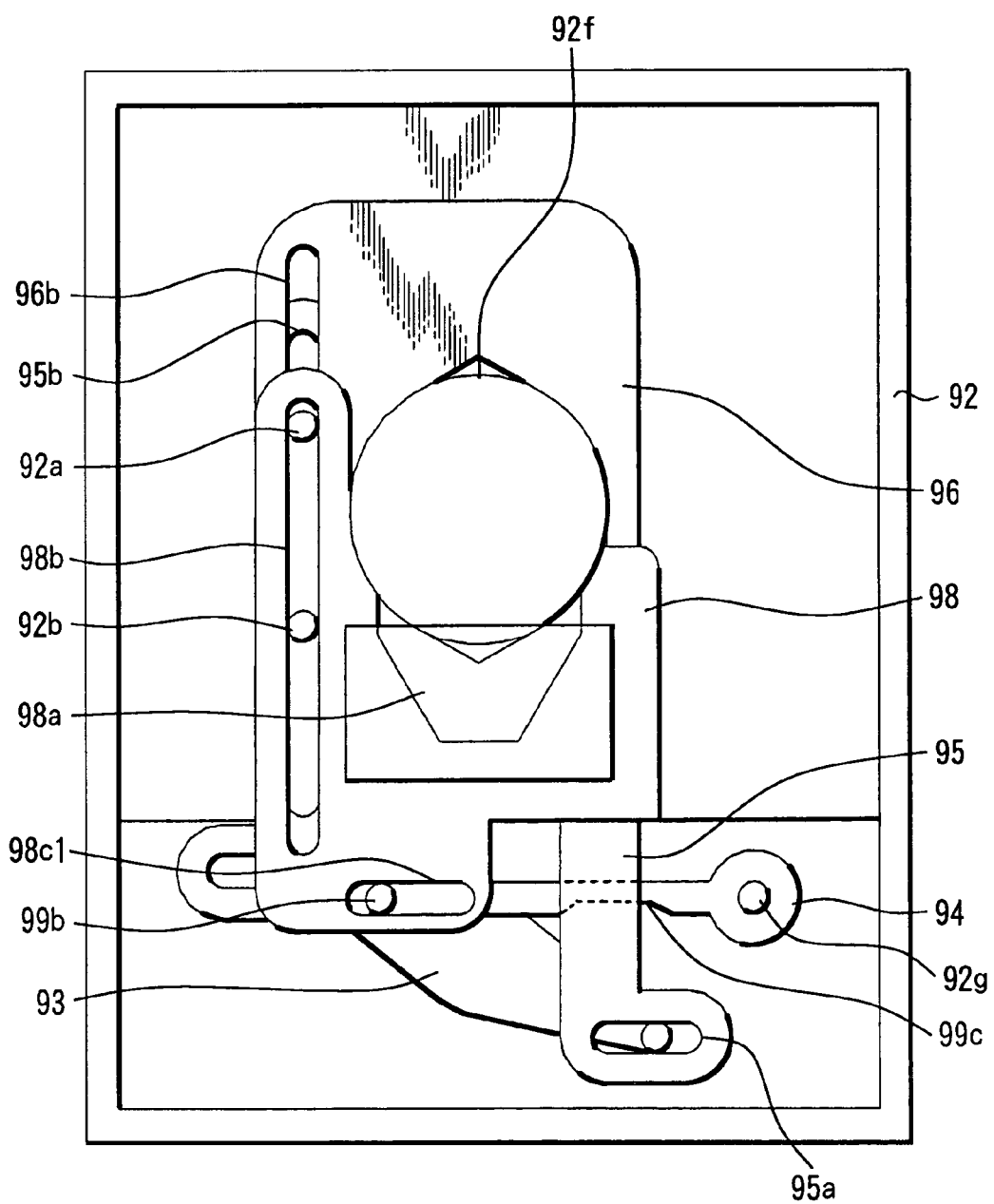
FIG. 16 is a front view of the light-quantity adjusting apparatus according to Embodiment 5.
Figure 17E:
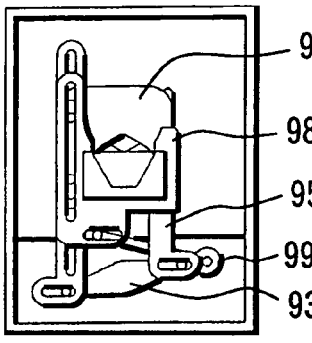
FIGS. 17(A) to 17(H) are explanatory diagrams obtained when an aperture is changed from an open state to a closed state in the light-quantity adjusting apparatus according to Embodiment 5.
Figure 17A:
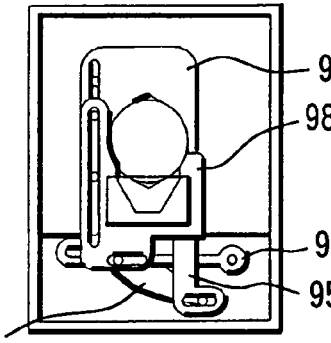
Figure 17F:
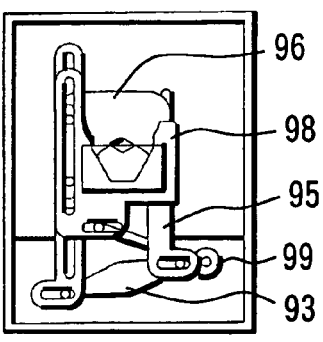
Figure 17B:
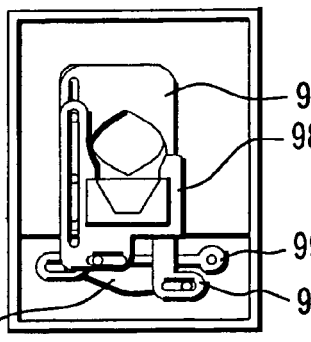
Figure 17G:
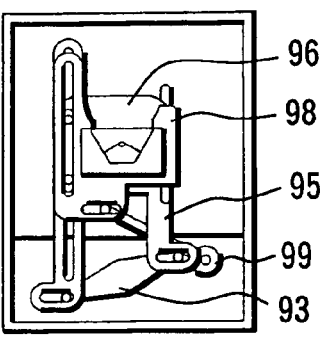
Figure 17C:
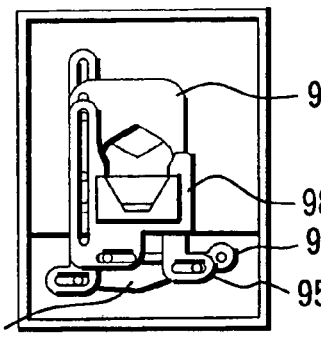
Figure 17H:
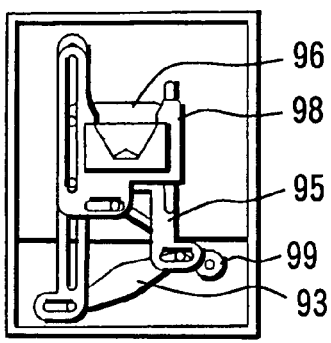
Figure 17D:
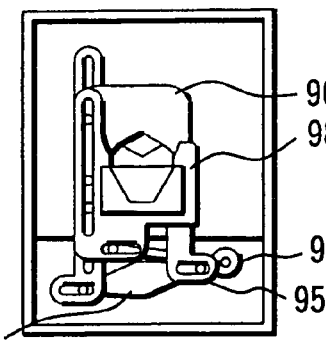

A light-quantity adjusting apparatus according to Embodiment 5 of the present invention will be described below with reference to FIGS. 15 to 17. FIG. 15 is an exploded perspective view of the light-quantity adjusting apparatus, FIG. 16 is a front view of the light-quantity adjusting apparatus, and FIGS. 17(A) to 17(H) are diagrams showing continuously operations of the light-quantity adjusting apparatus when a diaphragm aperture is changed from an open state to a closed state.

The same reference numerals as in Embodiment 4 denote the same parts in Embodiment 5, and a description thereof will be omitted. Like the light-quantity adjusting apparatus according to Embodiment 1, the light-quantity adjusting apparatus according to Embodiment 5 can be mounted on the lens barrel described in Embodiment 1.

A diaphragm blades 95 and 96 are driven through a rotary type electromagnetic actuator (motor) 91 and a seesaw-type diaphragm drive lever 93. A projection portion 93a of the diaphragm drive lever 93 is engaged with a long-hole portion 95a of the diaphragm blade 95, and a projection portion 93b of the diaphragm drive lever 93 is engaged with a long-hole portion 96a of the diaphragm blade 96.

Projection portions 92a and 92b formed on a bottom board (i.e., casing) 92 of a light-quantity adjusting apparatus 9 are engaged with long-hole portions 95b and 96b of the two diaphragm blades 95 and 96. For this reason, the diaphragm blades 95 and 96 are guided by the projection portions 92a and 92b of the bottom board 92 and reciprocated in the vertical direction of the apparatus (vertical direction in FIG. 16) depending on the rotation of the motor 91.

The projection portion 93a of the diaphragm drive lever 93 is brought into contact with an ND drive lever 99 in the middle of rotation of the diaphragm drive lever 93. A hole portion 99a of the ND drive lever 99 is fitted on a projection portion 92g of the bottom board 92, and the ND drive lever 99 can be rotated about the projection portion 92g. A projection portion 99b of the ND drive lever 99 is engaged with a long-hole portion 98c1 of a ND blade 98.

The ND drive lever 99 is counterclockwise energized around the projection portion 92g by a spring (not shown) in FIG. 16. When the projection portion 93a of the diaphragm drive lever 93 is not in contact with the ND drive lever 99, the ND drive lever 99 is in contact with a stopper (not shown). The long-hole portion 98b of the ND blade 98 is engaged with the projection portions 92a and 92b of the bottom board 92. When the ND drive lever 99 is rotated about the projection portion 92g of the bottom board 92, the ND blade 98 on which an ND filter 98a is stuck is reciprocated in the vertical direction of the apparatus (vertical direction in FIG. 16).

In this embodiment, on a side surface of the ND drive lever 99 with which the projection portion 93a of the diaphragm drive lever 93 is brought into contact, a end-face cam 99c having a curved surface is formed. Since the end-face cam 99c is formed, only when the diaphragm aperture formed by the diaphragm blades 95 and 96 is almost close, and the ND filter 98a completely covers the diaphragm aperture and then the light-quantity adjusting apparatus is in a state in which small-aperture diffraction caused by the ND filter does not occur, the moving speed of the ND blade 98 can be decreased. In this manner, the rotating angle (moving amount) of the ND blade 98 can be decreased by a decrease in moving speed of the ND blade 98, and the light-quantity adjusting apparatus (and an optical apparatus such as a camera) can be reduced in size.

What is claimed is:

1. An optical apparatus comprising:
   a light-quantity adjusting apparatus,
   wherein the light-quantity adjusting apparatus comprising:
      a main body that includes a fixed opening through which light passes;
      a drive source;
      plural light-blocking members that are moved in a region overlapping the fixed opening in an optical axis direction to change an area of a light-passing aperture formed by the plural light-blocking members;
      a neutral density filter that is movable in another region overlapping the fixed opening in the optical axis direction; and
      a drive mechanism that drives the plural light-blocking members and the neutral density filter by drive force from the drive source,
      wherein the drive mechanism includes a first drive member that receives the drive force from the drive source to be operated to drive the plural light-blocking members, and a second drive member that receives drive force from the first drive member to be operated to drive the neutral density filter, and
      wherein the second drive member does not receive the drive force from the first drive member until the area of the light-passing aperture reaches a predetermined area, and receives the drive force from the first drive member after the area of the light-passing aperture reaches the predetermined area to be operated to drive the neutral density filter at a moving speed higher than that of the plural light-blocking members with respect to the fixed opening.

2. The optical apparatus according to claim 1, wherein the second drive member drives the neutral density filter with changing the moving speed of the neutral density filter.

3. The optical apparatus according to claim 2, wherein the second drive member is provided with a projection portion, and a holding member that holds the neutral density filter includes a long-hole portion with which the projection portion engages, and wherein the long-hole portion has a bent shape.

4. The optical apparatus according to claim 2, wherein the second drive member is provided with a projection portion, and a holding member that holds the neutral density filter includes a straight long-hole portion with which the projection portion engages, and wherein the second drive member rotates to drive the holding member with changing a drive force transmission direction to the holding member with respect to a longitudinal direction of the straight long-hole portion.

5. The optical apparatus according to claim 2, wherein the first drive member comes into contact with the second drive member to drive the second drive member, and wherein the second drive member includes a cam surface that is formed at a portion with which the first drive member comes into contact.

6. The optical apparatus according to claim 1, wherein, in the neutral density filter, as compared to a width of a portion that covers the light-passing aperture first, a width of a portion that covers the light-passing aperture second is smaller.

* * * * *